(12) United States Patent
Teraoka

(10) Patent No.: US 11,668,913 B2
(45) Date of Patent: Jun. 6, 2023

(54) ZOOM LENS

(71) Applicant: Changzhou Raytech Optronics Co., Ltd., Changzhou (CN)

(72) Inventor: Hiroyuki Teraoka, Osaka (JP)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 288 days.

(21) Appl. No.: 17/227,405

(22) Filed: Apr. 12, 2021

(65) Prior Publication Data
US 2022/0283414 A1 Sep. 8, 2022

(30) Foreign Application Priority Data
Mar. 5, 2021 (JP) ............... JP2021-035846

(51) Int. Cl.
*G02B 15/14* (2006.01)
*G02B 15/177* (2006.01)
*G02B 15/20* (2006.01)
*G02B 27/00* (2006.01)
*G02B 13/00* (2006.01)

(52) U.S. Cl.
CPC .... *G02B 15/145511* (2019.08); *G02B 15/177* (2013.01); *G02B 15/20* (2013.01); *G02B 27/0025* (2013.01); *G02B 13/0045* (2013.01); *G02B 15/1465* (2019.08)

(58) Field of Classification Search
CPC .......... G02B 15/145511; G02B 15/177; G02B 15/20; G02B 13/0045; G02B 13/009; G02B 15/1465
See application file for complete search history.

(56) References Cited

U.S. PATENT DOCUMENTS 11,409,087 B1 * 8/2022 Teraoka ............. G02B 13/0045
2022/0283413 A1 * 9/2022 Teraoka ................. G02B 13/18

FOREIGN PATENT DOCUMENTS

| JP | H09159918 A | * | 6/1997 | ............. G02B 15/20 |
| JP | 2000275522 A | * | 10/2000 | ............. G02B 15/14 |

* cited by examiner

*Primary Examiner* — Kristina M Deherrera
(74) *Attorney, Agent, or Firm* — W&G Law Group

(57) ABSTRACT

The present disclosure relates to optical lens, and provides a zoom lens including, from an object side to an image side in sequence: a first lens having a negative refractive power, a second lens having a positive refractive power, a third lens having a negative refractive power, a fourth lens having a positive refractive power, a fifth lens group having a negative refractive power; distances between adjacent two of the first lens, the second lens, the third lens, the fourth lens and the fifth lens group are variable in the direction of the optical axis; the fifth lens group including a fifth lens having a positive refractive power and a sixth lens having a negative refractive power; wherein the zoom lens satisfies conditions of: f_Tele/f_Wide>1.8; $-1.85 \leq f3/f2 \leq -1.20$; and $2.00 \leq f4/f2 \leq 3.00$.

5 Claims, 15 Drawing Sheets

ZOOM LENS

TECHNICAL FIELD

The present disclosure relates to a zoom lens which has a telescoping structure, particularly, to a zoom lens which is suitable for a smart phone or a camera using imaging elements such as Charge Coupled Device (CCD) or Complementary Metal-Oxide Semiconductor Sensor (CMOS sensor) for high pixels, and the like, and which becomes bright and has excellent optical performance when an F number ("Fno" hereinafter) is less than 2 at the wide angle end, which become miniature when a zoom ratio is more than 1.8 and a total track length (TTL) is less than 9.00 mm when contracted, and which includes five groups of lenses having six lenses.

BACKGROUND

In recent years, a zoom lens has been sought which has an Fno of less than 2 at the wide angle end, has a zoom ratio of more than 2.0 and excellent optical performance, and which becomes miniature when a barrel is contracted into the camera to reduce the TTL at the time of non-shooting.

A development for a zoom lens having six lenses is being advanced. As the zoom lens which includes six lenses, a lens which consists of three groups having six lenses is proposed in the US Patent Publication No. US2020/0241265A1 (Patent Document 1 hereinafter).

In the camera optical lens disclosed in Embodiments of Patent Document 1, a zoom ratio is more than 4.74. However, when the Fno is more than 2.552, the camera optical lens has insufficient brightness, and TTL is long when shooting and miniaturization thereof is insufficient.

SUMMARY

An objective of the present disclosure is to provide a zoom lens which has TTL of less than 9.00 mm and becomes miniature when contracted, which becomes bright when an Fno at the wide angle end is of less than 2.0 at the time of photographing, which has excellent optical performance and a zoom ratio of more than 1.8, and which includes five groups of lenses having six lenses.

In order to achieve the above objective, the inventor conceived in the present disclosure a zoom lens capable of solving the problem in the existing technology, by studying a ratio of a focal length of the third lens to a focal length of the second lens, a ratio of a focal length of the fourth lens to a focal length of the second lens.

To solve the above technical problem, embodiments of the present disclosure provide a zoom lens. The zoom lens includes, from an object side to an image side in sequence: a first lens having a negative refractive power, a second lens having a positive refractive power, a third lens having a negative refractive power, a fourth lens having a positive refractive power, a fifth lens group having a negative refractive power; distances between adjacent two of the first lens, the second lens, the third lens, the fourth lens and the fifth lens group are variable in the direction of an optical axis; the fifth lens group includes a fifth lens having a positive refractive power and a sixth lens having a negative refractive power; and the zoom lens satisfies conditions of: $f\_Tele/f\_Wide>1.8$ (1); $-1.85 \leq f3/f2 \leq -1.20$ (2); and $2.00 \leq f4/f2 \leq 3.00$ (3); where $f\_Wide$ denotes a focal length of the zoom lens at the wide angle end; $f\_Tele$ denotes a focal length of the zoom lens at the telephoto end; f2 denotes a focal length of the second lens; f3 denotes a focal length of the third lens; f4 denotes a focal length of the fourth lens.

As an improvement, the zoom lens further satisfies a condition of: $-3.20 \leq f1/f2 \leq -2.50$ (4); where f1 denotes a focal length of the first lens, and f2 denotes a focal length of the second lens.

As an improvement, the zoom lens further satisfies a condition of: $-5.00 \leq fG5/f2 \leq -2.50$ (5); $-3.10 \leq f5/f6 \leq -2.00$ (6); where f2 denotes a focal length of the second lens; fG5 denotes a combined focal length of the fifth lens group; f5 denotes a focal length of the fifth lens; f6 denotes a focal length of the sixth lens.

As an improvement, the zoom lens further satisfies a condition of: $4.78 \leq LB\_Tele/LB\_Wide \leq 6.20$ (7); where LB_Wide denotes an on-axis distance from an image-side surface of the sixth lens to an image surface at the wide angel end; LB_Tele denotes an on-axis distance from an image-side surface of the sixth lens to an image surface at the telephoto end.

As an improvement, the zoom lens further satisfies a condition of: $76.00 \leq v1 \leq 82.00$ (8); $58.00 \leq v2 \leq 78.00$ (9); $76.00 \leq v6 \leq 82.00$ (10); where v1 denotes an abbe number of the first lens L1; v2 denotes an abbe number of the second lens L2; v6 denotes an abbe number of the sixth lens L6.

The present disclosure is advantageous in follows.

According to the present disclosure, the zoom lens is provided, which is suitable for a camera module of a smart phone or a WEB camera using imaging elements such as Charge Coupled Device (CCD) or Complementary Metal-Oxide Semiconductor Sensor (CMOS sensor) for high pixels, and the like, and which has TTL of less than 9.00 mm and becomes miniature when contracted, which has Fno of less than 2.0, a zoom ratio of more than 1.8 and excellent optical performance and becomes bright, and which includes five groups of lenses having six lenses.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

Figure 1:
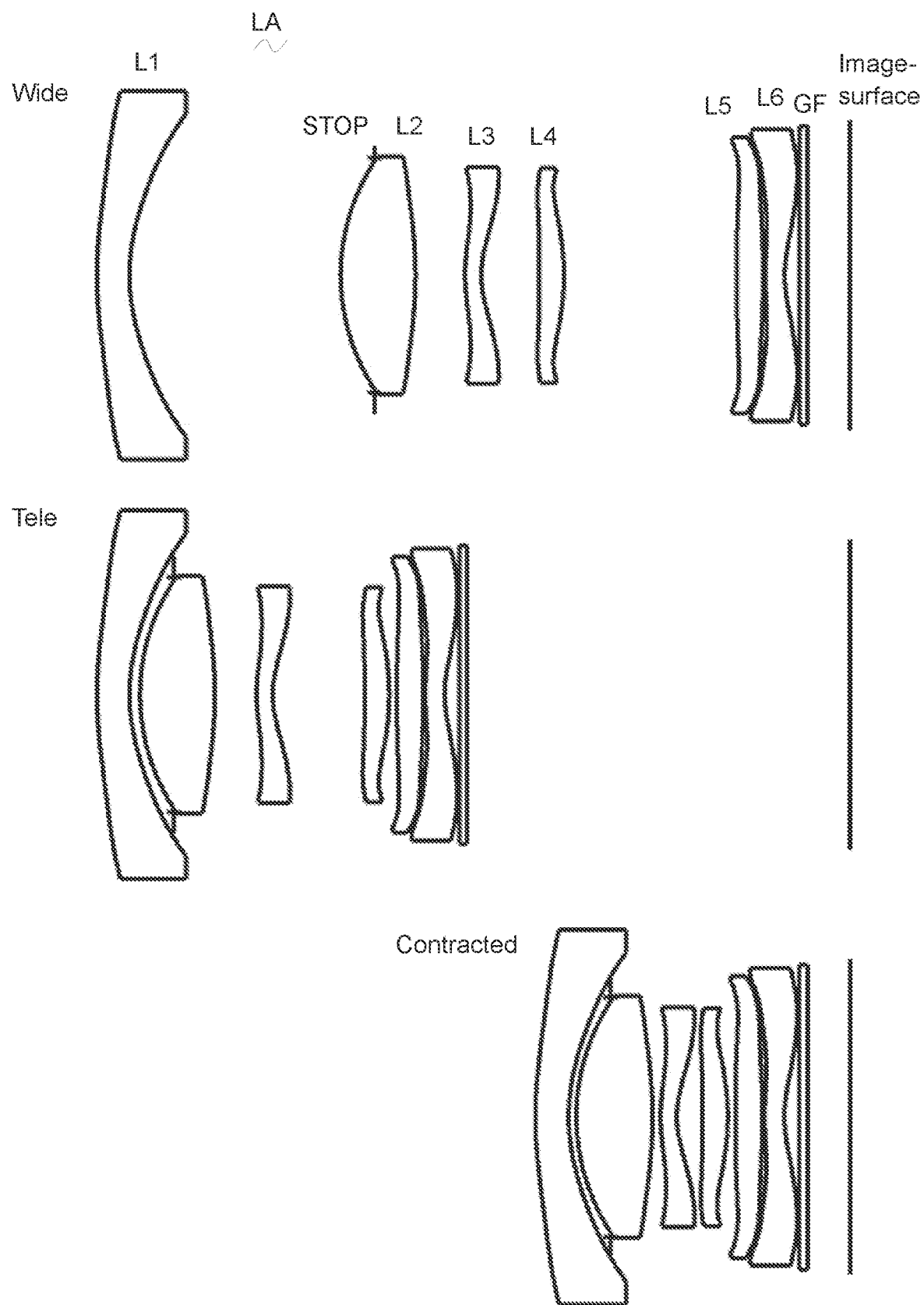
FIG. 1 is a schematic diagram of a structure of a zoom lens LA according to Embodiment 1 of the present disclosure.

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiments of a zoom lens in the present disclosure will be described. The zoom lens is a lens system which includes five groups of lenses having six lenses. The lens system includes, from an object side to an image side, a first lens L1, a second lens L2, a third lens L3, a fourth lens L4, a fifth lens group G5, where the fifth lens group includes a fifth lens L5 and a sixth lens L6. A glass plate GF is disposed between the sixth lens L6 and an image surface Si. The glass plate GF may include glass cover plates, various filters, and the like. In the present disclosure, the glass plate GF may be disposed at different positions or may be omitted.

In this embodiment, the first lens L1 has a negative refractive power, the second lens L2 has a positive refractive power, the third lens L3 has a negative refractive power, the fourth lens L4 has a positive refractive power, and the fifth lens group G5 has a negative refractive power. The fifth lens group G5 includes the fifth lens L5 and the sixth lens L6, where the fifth lens L5 has a positive refractive power, and the sixth lens L6 has a negative refractive power. For better correction to various distortions, all the surfaces of the six lenses are set as aspheric.

The zoom lens LA satisfies a condition of:

$$f\_Tele/f\_Wide > 1.8 \quad (1)$$

Condition (1) specifies a zoom ratio of the zoom lens LA. Within the condition (1), correction to various distortions is facilitated, and meanwhile the zoom ratio is sufficient.

The zoom lens LA satisfies a condition of:

$$-1.85 \leq f3/f2 \leq -1.20 \quad (2)$$

Condition (2) specifies a ratio of a focal length f3 of the third lens L3 to a focal length f2 of the second lens L2. Within the condition (2), miniaturization when contracted is facilitated, and meanwhile correction to various distortions is facilitated when Fno is less than 2.0 and the zoom ratio is more than 1.8 at the wide angle end.

The zoom LA satisfies a condition of:

$$2.00 \leq f4/f2 \leq 3.00 \quad (3)$$

Condition (3) specifies a ratio of a focal length f4 of the fourth lens L4 to a focal length f2 of the second lens L2. Within the condition (3), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$-3.20 \leq f1/f2 \leq -2.50 \quad (4)$$

Condition (4) specifies a ratio of a focal length f1 of the first lens L1 to a focal length f2 of the second lens L2. Within the condition (4), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$-5.00 \leq fG5/f2 \leq -2.50 \quad (5)$$

Condition (5) specifies a ratio of a combined focal length fG5 of the first lens L1 to a focal length f2 of the second lens L2. Within the condition (5), miniaturization when contracted is facilitated, and meanwhile correction to various distortions is facilitated when Fno is less than 2.0 and the zoom ratio is more than 1.8 at the wide angle end.

The zoom LA satisfies a condition of:

$$-3.10 \leq f5/f6 \leq -2.00 \quad (6)$$

Condition (6) specifies a ratio of a focal length f5 of the fifth lens L5 to a focal length f6 of the six lens L6. Within the condition (6), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$4.78 \leq LB\_Tele/LB\_Wide \leq 6.20 \quad (7)$$

Condition (7) specifies a ratio of an on-axis distance from an image-side surface of the sixth lens to an image surface at the telephoto end to an on-axis distance from an image-side surface of the sixth lens to an image surface at the wide angel end. Within the condition (7), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$76.00 \leq v1 \leq 82.00 \quad (8)$$

Condition (8) specifies an abbe number of the first lens L1. Within the condition (8), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$58.00 \le v2 \le 78.00 \qquad (9)$$

Condition (9) specifies an abbe number of the first lens L1. Within the condition (9), miniaturization when contracted is facilitated, and meanwhile correction to various distortions is facilitated when Fno is less than 2.0 and the zoom ratio is more than 1.8 at the wide angle end.

The zoom lens LA satisfies a condition of:

$$76.00 \le v6 \le 82.00 \qquad (10)$$

Condition (10) specifies an abbe number of the first lens L1. Within the condition (10), miniaturization when contracted is facilitated, and meanwhile correction to various distortions is facilitated when Fno is less than 2.0 and the zoom ratio is more than 1.8 at the wide angle end.

With the five groups of lenses having six lenses included in the zoo lens LA satisfying the above structure and conditions respectively, the zoom lens LA is obtained which has TTL of less than 9.00 mm and becomes miniature when contracted, which has Fno of less than 2.0, a zoom ratio of more than 1.8 and an excellent optical performance and becomes bright, and which includes five groups of lenses having six lenses.

Embodiments

The zoom lens LA will be further described with reference to the following examples. Symbols used in various examples are shown as follows. It should be noted that the distance, central curvature radius, and on-axis thickness are all in units of mm.

f: focal length of the zoom lens;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
fG5: combined focal length of the fifth lens group G5;
FNO: ratio of an effective focal length and an entrance pupil diameter of the zoom lens;
2ω: full viewing angle;
STOP: aperture;
R: curvature radius of an optical surface (central curvature radius in the condition of the lens);
R1: central curvature radius of the object-side surface S1 of the first lens L1;
R2: central curvature radius of the image-side surface S2 of the first lens L1;
R3: central curvature radius of the object-side surface S3 of the second lens L2;
R4: central curvature radius of the image-side surface S4 of the second lens L2;
R5: central curvature radius of the object-side surface S5 of the third lens L3;
R6: central curvature radius of the image-side surface S6 of the third lens L3;
R7: central curvature radius of the object-side surface S7 of the fourth lens L4;
R8: central curvature radius of the image-side surface S8 of the fourth lens L4;
R9: central curvature radius of the object-side surface S9 of the fifth lens L5;
R10: central curvature radius of the image-side surface S10 of the fifth lens L5;
R11: central curvature radius of the object-side surface S11 of the sixth lens L6;
R12: central curvature radius of the image-side surface S12 of the sixth lens L6;
R13: central curvature radius of an object-side surface S13 of the glass plate GF;
R14: central curvature radius of an image-side surface S14 of the glass plate GF;
d: on-axis thickness of a lens or an on-axis distance between lenses;
d1: on-axis thickness of the first lens L1;
D12: on-axis distance from the image-side surface S2 of the first lens L1 to the object-side surface S3 of the second lens L2;
d2: on-axis distance from the image-side surface S2 of the first lens L1 to the aperture STOP;
d3: on-axis distance from the aperture STOP to the object-side surface S3 of the second lens L2;
d4: on-axis thickness of the second lens L2;
d5: on-axis distance from the image-side surface S4 of the second lens L2 to the object-side surface S5 of the third lens L3;
d6: on-axis thickness of the third lens L3;
d7: on-axis distance from the image-side surface S6 of the third lens L3 to the object-side surface S7 of the fourth lens L4;
d8: on-axis thickness of the fourth lens L4;
d9: on-axis distance from the image-side surface S8 of the fourth lens L4 to the object-side surface S9 of the fifth lens L5;
d10: on-axis thickness of the fifth lens L5;
d11: on-axis distance from the image-side surface S10 of the fifth lens L5 to the object-side surface S11 of the sixth lens L6;
d12: on-axis thickness of the sixth lens L6;
d13: on-axis distance from the image-side surface S12 of the sixth lens L6 to the object-side surface S13 of the glass plate GF;
d14: on-axis thickness of the glass plate GF;
d15: on-axis distance from the image-side surface S14 of the glass plate GF to the object-side surface S15 of the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg: refractive index of the d line of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the glass plate GF;
TTL: Total optical length (on-axis distance from the object side surface S1 of the first lens L1 to the image surface of the zoom lens) in mm;
LB: on-axis distance from the image-side surface S12 of the sixth lens L6 to the image surface.

Embodiment 1

FIG. 1 is a schematic diagram of a structure of the zoom LA according to Embodiment 1 of the present disclosure. Table 1 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 2 shows the values of A, B, C, D and E when contracted or photographing. Table 3 shows the conic coefficient k and the aspheric surface coefficients. Table 4 shows values of Fno, 2ω, f, TTL, LB, f1, f2, f3, f4, fG5, f5, f6, IH and zoom ratio.

The design data of the zoom LA in Embodiment 1 of the present disclosure are shown in Table 1.

TABLE 1

|  |  | R | d |  |  | nd |  | vd | effective radius (mm) |
|---|---|---|---|---|---|---|---|---|---|
| S1 | R1 | 9.61540 | d1 |  | 0.848 | nd1 | 1.4959 | v1 81.655 | 4.789 |
| S2 | R2 | 4.78994 | D12 | d2 | A |  |  |  | 4.201 |
| Stop |  | ∞ | d3 |  | −0.875 |  |  |  | 3.058 |
| S3 | R3 | 5.43455 | d4 |  | 1.945 | nd2 | 1.5806 | v2 60.079 | 3.085 |
| S4 | R4 | −10.30283 | d5 |  | B |  |  |  | 3.068 |
| S5 | R5 | 4.22326 | d6 |  | 0.418 | nd3 | 1.6700 | v3 19.392 | 2.804 |
| S6 | R6 | 2.37762 | d7 |  | C |  |  |  | 2.792 |
| S7 | R7 | −72.30089 | d8 |  | 0.643 | nd4 | 1.5438 | v4 56.029 | 2.792 |
| S8 | R8 | −6.42171 | d9 |  | D |  |  |  | 2.768 |
| S9 | R9 | −422.21458 | d10 |  | 0.687 | nd5 | 1.6700 | v5 19.392 | 3.482 |
| S10 | R10 | −16.16554 | d11 |  | 0.050 |  |  |  | 3.599 |
| S11 | R11 | 6.61558 | d12 |  | 0.507 | nd6 | 1.4959 | v6 81.655 | 3.617 |
| S12 | R12 | 2.97312 | d13 |  | 0.380 |  |  |  | 3.798 |
| S13 | R13 | ∞ | d14 |  | 0.210 | ndg | 1.5168 | vg 64.167 | 3.868 |
| S14 | R14 | ∞ | d15 |  | E |  |  |  | 3.890 |

Reference wavelength = 587.6 nm

TABLE 2

|  | Photographing | | Contracted |
|---|---|---|---|
|  | Wide | Tele |  |
| A | 6.374 | 1.150 | 1.075 |
| B | 1.292 | 1.087 | 0.200 |
| C | 1.511 | 2.391 | 0.654 |
| D | 4.498 | 0.200 | 0.200 |
| E | 1.114 | 9.960 | 0.890 |

TABLE 3

| | Conic coefficient | Aspheric surface coefficients | | | |
|---|---|---|---|---|---|
| | k | A4 | A6 | A8 | A10 |
| S1 | 0.0000E+00 | −3.7161E−03 | 2.1150E−04 | −8.6464E−06 | 3.2195E−07 |
| S2 | 0.0000E+00 | −5.0043E−03 | 2.7486E−04 | −2.2796E−05 | 1.9983E−06 |
| S3 | −4.1073E−01 | 4.8828E−04 | −2.6565E−05 | 1.2402E−05 | −2.4815E−06 |
| S4 | 0.0000E+00 | 2.6570E−03 | −5.5477E−05 | 7.0596E−06 | −5.7191E−06 |
| S5 | 0.0000E+00 | −4.3942E−02 | 1.0026E−02 | −2.0167E−03 | 2.9806E−04 |
| S6 | −4.1210E+00 | −2.6213E−02 | 7.1515E−03 | −1.6809E−03 | 2.8826E−04 |
| S7 | 0.0000E+00 | −3.2293E−03 | 8.8623E−04 | −3.9750E−04 | 1.3776E−04 |
| S8 | 2.1814E−01 | 1.7419E−03 | 3.3061E−04 | 5.2942E−05 | −1.0663E−05 |
| S9 | 0.0000E+00 | 9.8434E−03 | −4.1050E−03 | 1.0649E−03 | −1.7264E−04 |
| S10 | 0.0000E+00 | 1.4996E−02 | −7.5983E−03 | 2.0379E−03 | −2.9367E−04 |
| S11 | −5.0000E+01 | −1.8444E−02 | 5.4669E−04 | 6.5146E−04 | −1.1815E−04 |
| S12 | −1.0143E+01 | −1.4135E−02 | 2.5607E−03 | −2.9863E−04 | 1.8766E−05 |

| | Conic coefficient | Aspheric surface coefficients | | |
|---|---|---|---|---|
| | k | A12 | A14 | A16 |
| S1 | 0.0000E+00 | −9.9365E−09 | 2.2247E−10 | −2.7730E−12 |
| S2 | 0.0000E+00 | −1.4272E−07 | 6.0406E−09 | −1.1574E−10 |
| S3 | −4.1073E−01 | 1.6043E−07 | 6.0347E−09 | −9.7092E−10 |
| S4 | 0.0000E+00 | 1.0816E−06 | −8.7358E−08 | 2.3508E−09 |
| S5 | 0.0000E+00 | −2.9519E−05 | 1.6781E−06 | −4.0053E−08 |
| S6 | −4.1210E+00 | −3.2808E−05 | 2.1394E−06 | −5.9001E−08 |
| S7 | 0.0000E+00 | −1.8645E−05 | 1.0372E−06 | −1.9847E−08 |
| S8 | 2.1814E−01 | 7.9451E−06 | −1.2973E−06 | 5.9210E−08 |

TABLE 3-continued

| | | | |
|---|---|---|---|
| S9 | 0.0000E+00 | 1.6328E−05 | −8.4011E−07 | 1.8139E−08 |
| S10 | 0.0000E+00 | 2.3324E−05 | −9.9462E−07 | 1.8163E−08 |
| S11 | −5.0000E+01 | 8.3999E−06 | −2.6527E−07 | 3.0971E−09 |
| S12 | −1.0143E+01 | −6.0983E−07 | 9.6600E−09 | −5.9281E−11 |

Herein, k denotes a conic coefficient, A4, A6, A8, A10, A12, A14, A16 denote aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (11)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (11). However, the present disclosure is not limited to the aspherical polynomials forms shown the formula (11).

TABLE 4

| | Wide | Tele |
|---|---|---|
| Fno | 1.94 | 3.11 |
| 2ω (°) | 46.96 | 24.13 |
| f (mm) | 9.252 | 18.503 |

| | Wide | Tele | Contracted |
|---|---|---|---|
| TTL (mm) | 19.600 | 19.600 | 7.831 |
| LB (mm) | 1.704 | 10.550 | 1.480 |
| f1 (mm) | −20.436 | | |
| f2 (mm) | 6.419 | | |
| f3 (mm) | −8.931 | | |
| f4 (mm) | 12.915 | | |
| fG5 (mm) | −22.052 | | |
| f5 (mm) | 25.069 | | |
| f6 (mm) | −11.415 | | |
| IH (mm) | 4.000 | | |
| Zoom ratio | 2.000 | | |

In the subsequent Table 21, various parameters of Embodiments 1, 2, 3, 4 and 5 and values corresponding to the parameters specified in the above conditions (1) to (10) are shown.

As shown in Table 21, Embodiment 1 satisfies the conditions (1) to (10).

Figure 2:
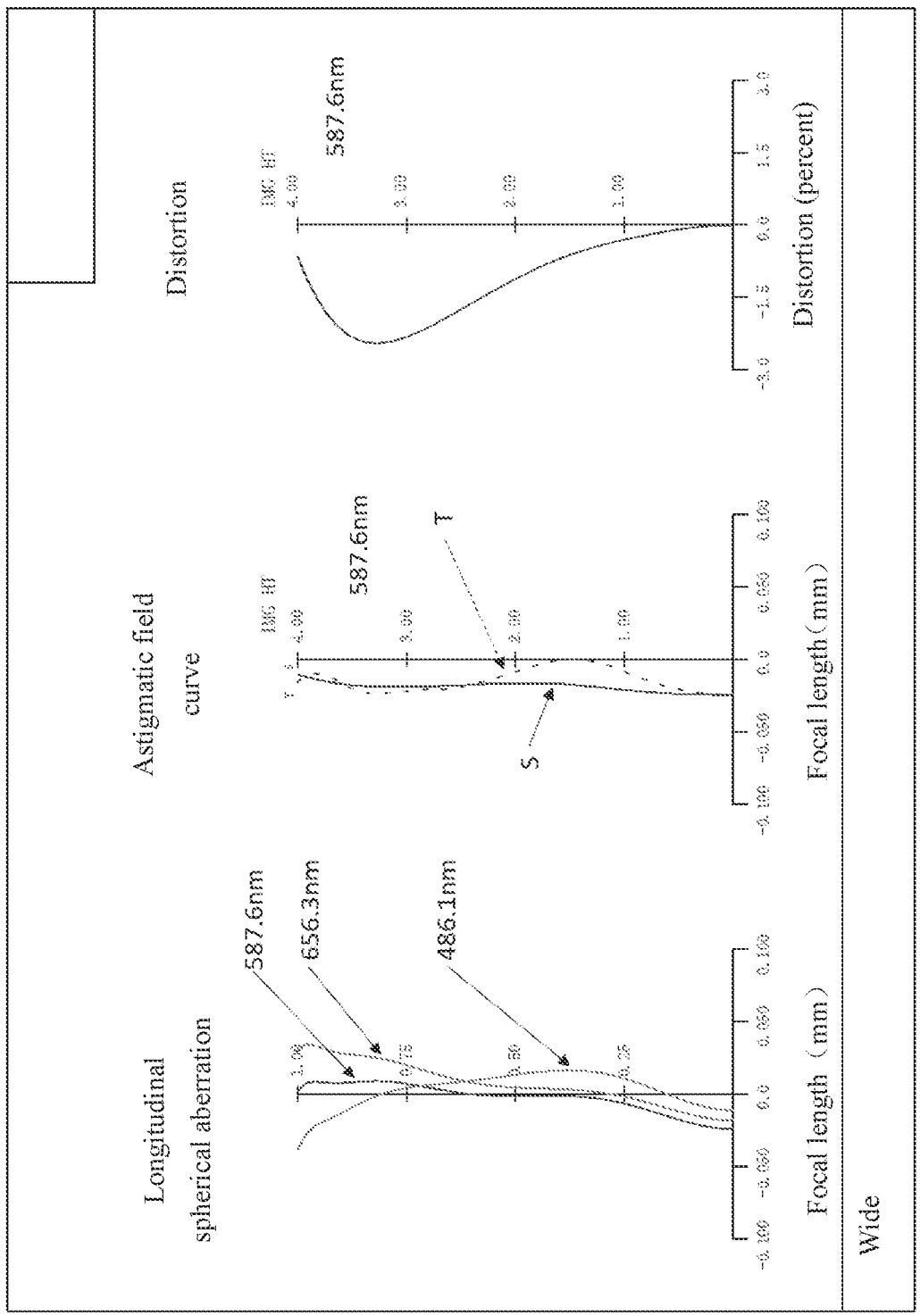
FIG. 2 is a schematic diagram showing longitudinal spherical aberrations, astigmatic field curves and distortions of the zoom lens LA at the wide angle end according to Embodiment 1 of the present disclosure.
Figure 3:
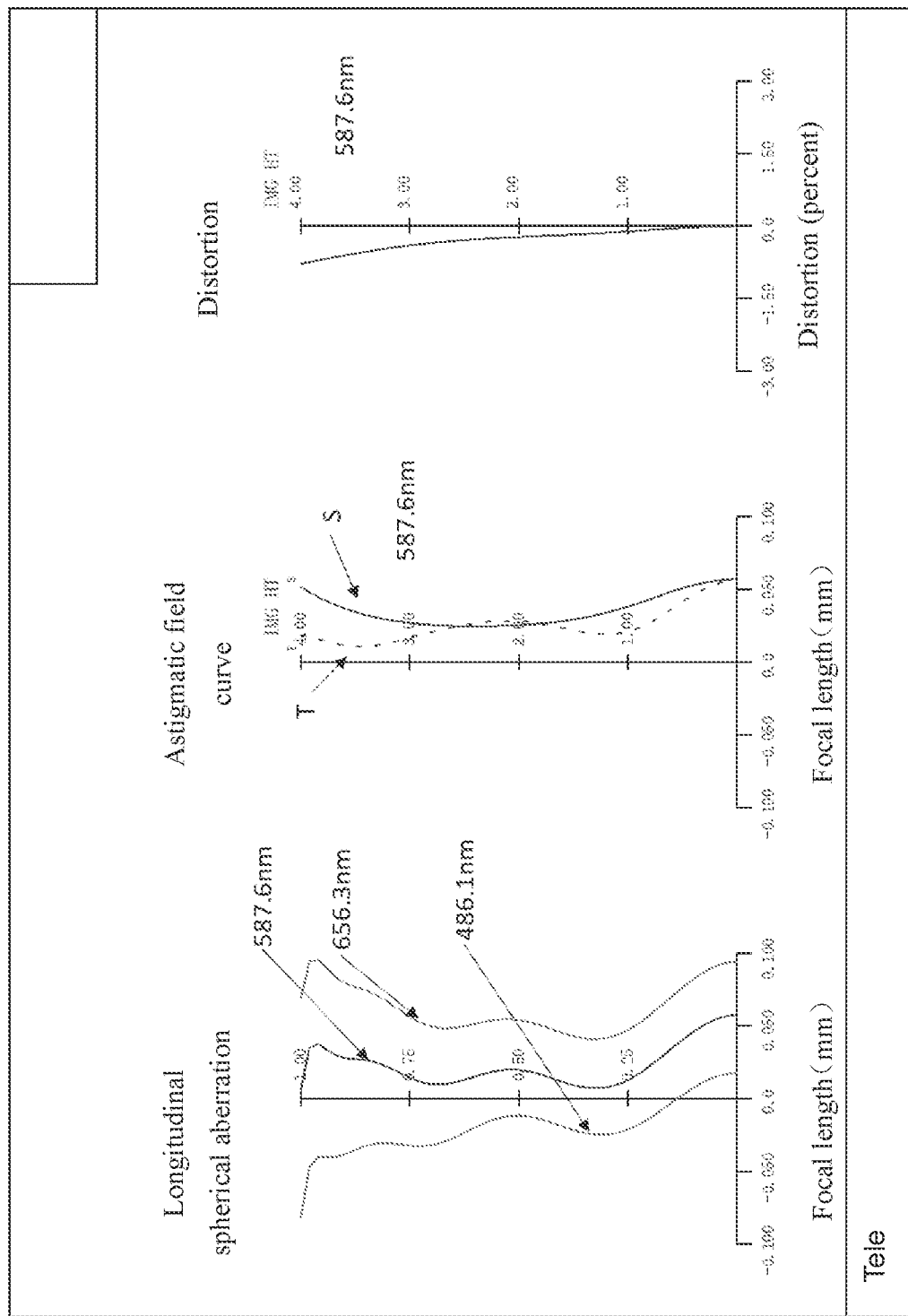
FIG. 3 is a schematic diagram showing longitudinal spherical aberrations, astigmatic field curves and distortions of the zoom lens LA at the telephoto end according to Embodiment 1 of the present disclosure.

FIG. 2 is a schematic diagram showing longitudinal spherical aberrations, astigmatic field curves and distortions of the zoom lens LA at the wide angle end according to Embodiment 1 of the present disclosure. FIG. 3 is a schematic diagram showing longitudinal spherical aberrations, astigmatic field curves and distortions of the zoom lens LA at the telephoto end according to Embodiment 1 of the present disclosure. It should be noted that a field curvature S is a field curvature in a sagittal direction, and T is a field curvature in a tangential direction which are also employed in embodiments 2, 3, 4, and 5. It can be known that the zoom lens becomes miniature with TTL equal to 7.831 and becomes bright with Fno equal to 1.94, and has a zoom ratio equal to 2.000 at the wide angle end and has excellent optical performance as shown in FIG. 2 and FIG. 3 in Embodiment 1 of the present disclosure.

Embodiment 2

Figure 4:
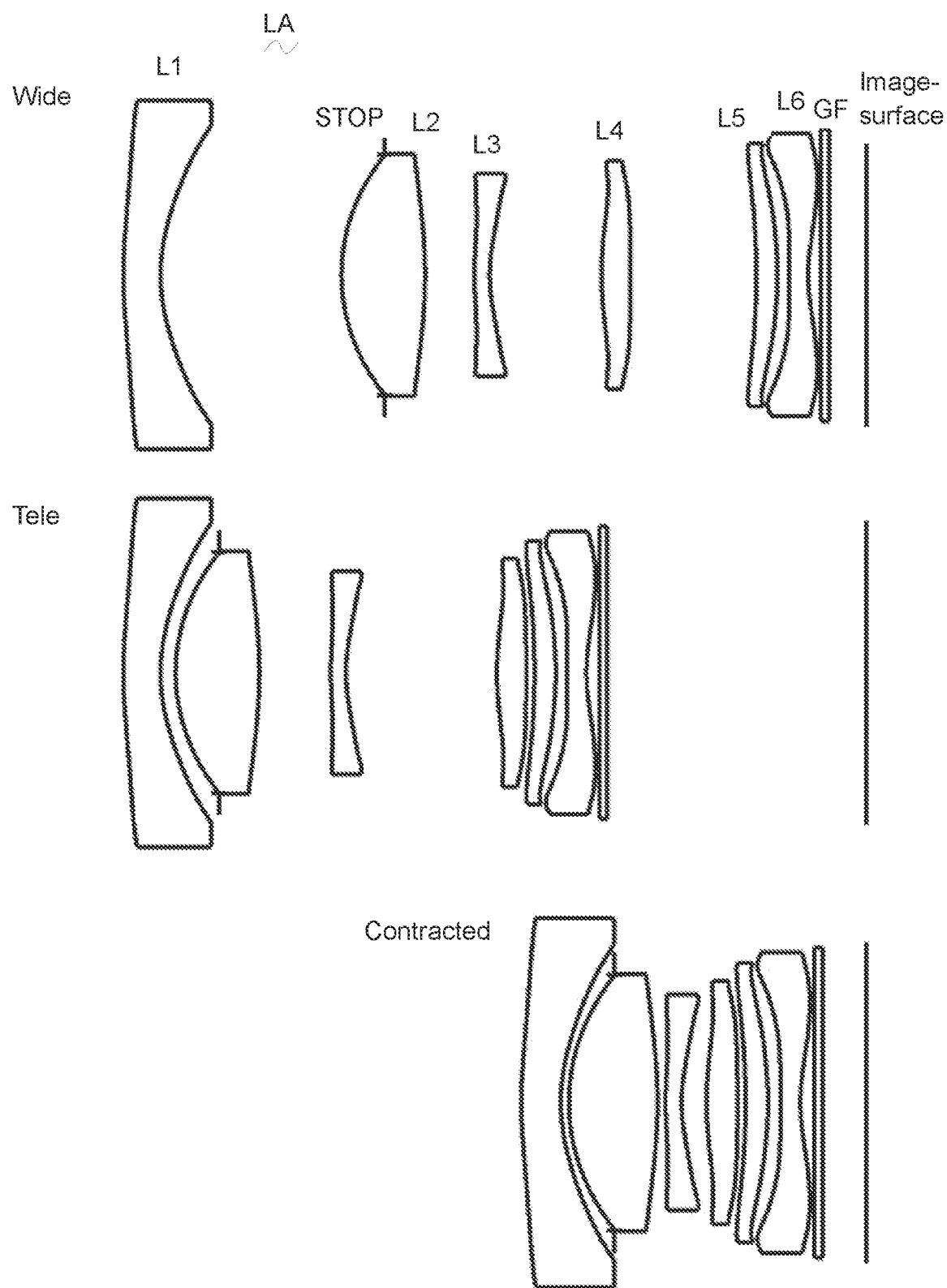
FIG. 4 is a schematic diagram of a structure of a zoom lens LA according to Embodiment 2 of the present disclosure.

FIG. 4 is a schematic diagram of a structure of the zoom LA according to Embodiment 2 of the present disclosure. Table 5 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 6 shows the values of A, B, C, D and E when contracted or photographing. Table 7 shows the conic coefficient k and the aspheric surface coefficients. Table 8 shows values of Fno, 2ω, f, TTL, LB, f1, f2, f3, f4, fG5, f5, f6, IH and zoom ratio.

TABLE 5

| | | R | d | | nd | vd | effective radius (mm) |
|---|---|---|---|---|---|---|---|
| S1 | R1 | 11.54916 | d1 | 0.980 | nd1 | 1.4959 v1 | 81.655 | 4.604 |
| S2 | R2 | 4.52385 | D12 d2 | A | | | 3.947 |
| Stop | | ∞ | d3 | −1.131 | | | 3.190 |
| S3 | R3 | 4.79882 | d4 | 2.206 | nd2 | 1.5806 v2 | 60.079 | 3.202 |
| S4 | R4 | −12.36368 | d5 | B | | | 3.127 |
| S5 | R5 | 8.18784 | d6 | 0.400 | nd3 | 1.6700 v3 | 19.392 | 2.689 |
| S6 | R6 | 3.84986 | d7 | C | | | 2.500 |
| S7 | R7 | 8.58565 | d8 | 0.770 | nd4 | 1.5438 v4 | 56.029 | 2.990 |
| S8 | R8 | −65.64031 | d9 | D | | | 3.025 |
| S9 | R9 | −16.92466 | d10 | 0.557 | nd5 | 1.6700 v5 | 19.392 | 3.481 |
| S10 | R10 | −8.47675 | d11 | 0.309 | | | 3.476 |
| S11 | R11 | 85.55021 | d12 | 0.500 | nd6 | 1.4959 v6 | 81.655 | 3.705 |
| S12 | R12 | 4.55212 | d13 | 0.340 | | | 3.741 |
| S13 | R13 | ∞ | d14 | 0.210 | ndg | 1.5168 vg | 64.167 | 3.845 |
| S14 | R14 | ∞ | d15 | E | | | 3.871 |

Reference wavelength = 587.6 nm

TABLE 6

| | Photographing | | |
| --- | --- | --- | --- |
| | Wide | Tele | Contracted |
| A | 5.904 | 1.533 | 1.333 |
| B | 1.301 | 1.884 | 0.200 |
| C | 2.951 | 3.988 | 0.620 |
| D | 3.315 | 0.221 | 0.200 |
| E | 0.989 | 6.835 | 0.890 |

TABLE 7

| | Conic coefficient | Aspheric surface coefficients | | | |
| --- | --- | --- | --- | --- | --- |
| | k | A4 | A6 | A8 | A10 |
| S1 | 0.0000E+00 | −4.3273E−03 | 3.0195E−04 | −1.3551E−05 | 3.9245E−07 |
| S2 | 0.0000E+00 | −6.2743E−03 | 3.7607E−04 | −2.5241E−05 | 1.4655E−06 |
| S3 | −5.5335E−01 | 2.6661E−04 | −2.7405E−05 | 1.8364E−05 | −4.2766E−06 |
| S4 | 0.0000E+00 | 1.3787E−03 | 1.5428E−04 | −6.0202E−05 | 1.0644E−05 |
| S5 | 0.0000E+00 | −2.6907E−02 | 6.5909E−03 | −1.3197E−03 | 2.1250E−04 |
| S6 | −3.8955E+00 | −2.5433E−02 | 7.8649E−03 | −1.9084E−03 | 3.7605E−04 |
| S7 | 0.0000E+00 | −3.6049E−03 | −1.8631E−04 | −7.8918E−05 | 2.1912E−05 |
| S8 | 4.6350E+01 | −2.9343E−04 | −4.3523E−04 | 3.9347E−05 | −1.0555E−05 |
| S9 | 0.0000E+00 | 4.3758E−03 | −1.5179E−03 | 1.7440E−04 | 3.8823E−06 |
| S10 | 0.0000E+00 | 1.1313E−02 | −3.6859E−03 | 4.3334E−04 | 8.7735E−06 |
| S11 | −4.3256E+01 | −1.0058E−02 | 7.6167E−04 | −4.6670E−04 | 1.6076E−04 |
| S12 | −1.5106E+01 | −6.3607E−03 | 2.8458E−04 | −1.8017E−05 | 1.1228E−05 |

| | Conic coefficient | Aspheric surface coefficients | | |
| --- | --- | --- | --- | --- |
| | k | A12 | A14 | A16 |
| S1 | 0.0000E+00 | −4.3114E−09 | −9.6807E−11 | 2.4063E−12 |
| S2 | 0.0000E+00 | −9.2753E−08 | 4.2407E−09 | −1.0222E−10 |
| S3 | −5.5335E−01 | 5.2175E−07 | −3.1865E−08 | 7.6092E−10 |
| S4 | 0.0000E+00 | −1.0830E−06 | 5.9866E−08 | −1.4064E−09 |
| S5 | 0.0000E+00 | −2.3490E−05 | 1.5289E−06 | −4.3300E−08 |
| S6 | −3.8955E+00 | −5.0004E−05 | 3.8761E−06 | −1.2844E−07 |
| S7 | 0.0000E+00 | −3.5289E−06 | 3.3353E−07 | −1.0855E−08 |
| S8 | 4.6350E+01 | 1.8938E−06 | −1.5287E−07 | 6.3304E−09 |
| S9 | 0.0000E+00 | −1.9526E−06 | 1.1519E−07 | −1.7113E−09 |
| S10 | 0.0000E+00 | −5.5236E−06 | 3.8284E−07 | −7.6534E−09 |
| S11 | −4.3256E+01 | −2.2796E−05 | 1.4432E−06 | −3.3666E−08 |
| S12 | −1.5106E+01 | −2.0799E−06 | 1.4161E−07 | −3.2697E−09 |

TABLE 8

| | Wide | Tele |
| --- | --- | --- |
| Fno | 1.96 | 3.10 |
| 2ω (°) | 47.21 | 24.65 |
| f (mm) | 9.261 | 18.525 |

| | Wide | Tele | Contracted |
| --- | --- | --- | --- |
| TTL (mm) | 19.600 | 19.600 | 8.383 |
| LB (mm) | 1.539 | 7.385 | 1.440 |
| f1 (mm) | −15.723 | | |
| f2 (mm) | 6.249 | | |
| f3 (mm) | −11.261 | | |
| f4 (mm) | 14.013 | | |
| fG5 (mm) | −16.384 | | |
| f5 (mm) | 24.692 | | |
| f6 (mm) | −9.715 | | |
| IH (mm) | 4.000 | | |
| Zoom ratio | 2.000 | | |

As shown in Table 21, Embodiment 2 satisfies the conditions (1) to (10).

Figure 5:
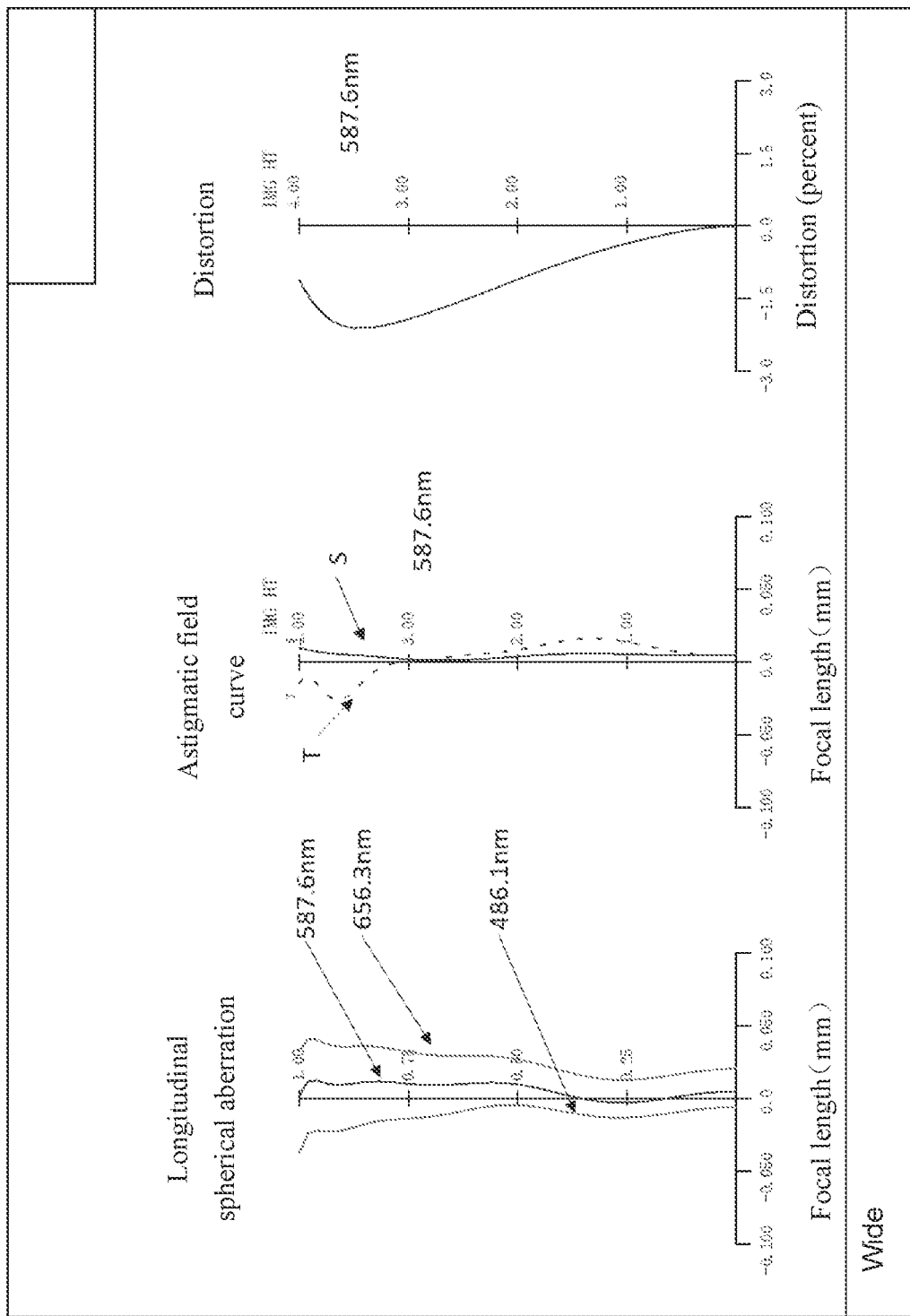
FIG. 5 is a schematic diagram showing longitudinal spherical aberrations, astigmatic field curves and distortions of the zoom lens LA at the wide angle end according to Embodiment 2 of the present disclosure.
Figure 6:
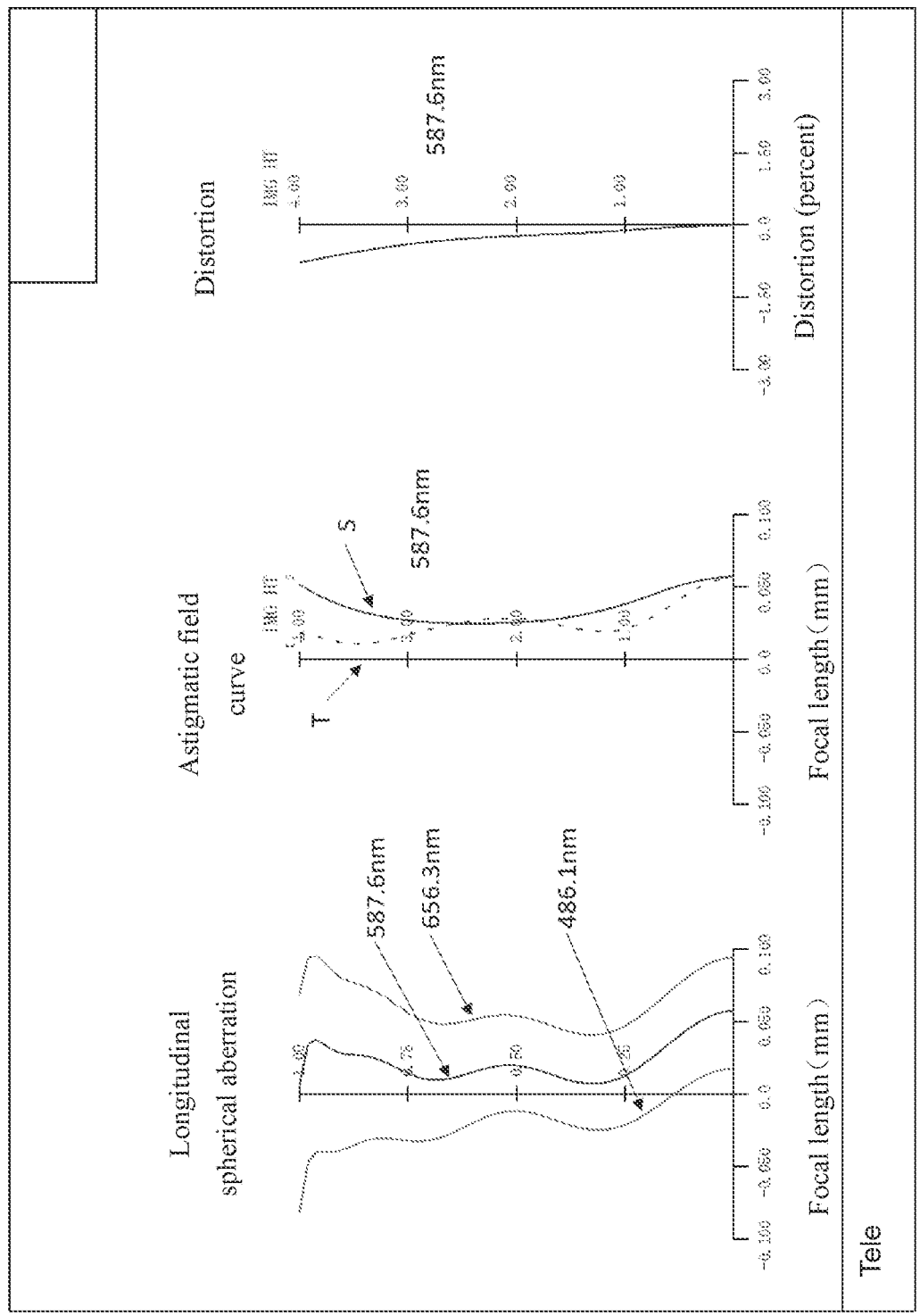
FIG. 6 is a schematic diagram showing longitudinal spherical aberrations, astigmatic field curves and distortions of the zoom lens LA at the telephoto end according to Embodiment 2 of the present disclosure.

FIG. 5 is a schematic diagram showing longitudinal spherical aberrations, astigmatic field curves and distortions of the zoom lens LA at the wide angle end according to Embodiment 2 of the present disclosure. FIG. 6 is a schematic diagram showing longitudinal spherical aberrations, astigmatic field curves and distortions of the zoom lens LA at the telephoto end according to Embodiment 2 of the present disclosure. It can be known that the zoom lens becomes miniature with TTL equal to 8.383 and becomes bright with Fno equal to 1.96 and has a zoom ratio equal to 2.000 at the wide angle end and has excellent optical performance as shown in FIG. 5 and FIG. 6 in Embodiment 2 of the present disclosure.

Embodiment 3

Figure 7:
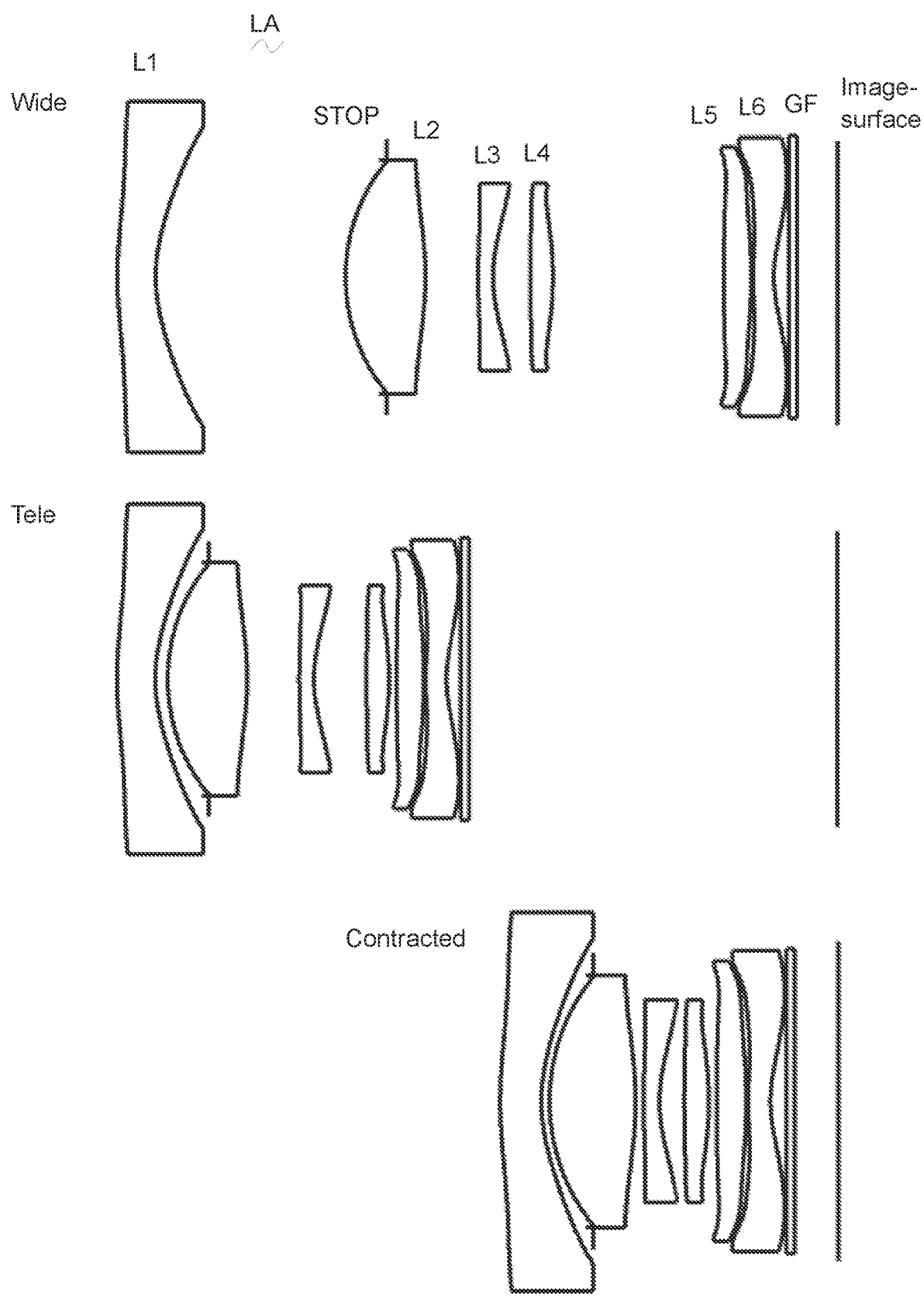
FIG. 7 is a schematic diagram of a structure of a zoom lens LA according to Embodiment 3 of the present disclosure.

FIG. 7 is a schematic diagram of a structure of the zoom LA according to Embodiment 3 of the present disclosure. Table 9 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 10 shows the values of A, B, C, D and E when contracted or photographing. Table 11 shows the conic coefficient k and the aspheric surface coefficients. Table 12 shows values of Fno, 2ω, f, TTL, LB, f1, f2, f3, f4, fG5, f5, f6, IH and zoom ratio.

TABLE 9

|  |  | R |  | d |  | nd |  | vd |  | effective radius (mm) |
|---|---|---|---|---|---|---|---|---|---|---|
| S1 | R1 | 10.58008 | d1 | 1.042 | nd1 | 1.4959 | v1 | 81.655 | | 4.784 |
| S2 | R2 | 4.52948 | D12 | d2 A | | | | | | 4.108 |
| Stop | | ∞ | d3 | −1.107 | | | | | | 3.177 |
| S3 | R3 | 5.07855 | d4 | 2.168 | nd2 | 1.5806 | v2 | 60.079 | | 3.187 |
| S4 | R4 | −8.45974 | d5 | B | | | | | | 3.062 |
| S5 | R5 | 16.45587 | d6 | 0.400 | nd3 | 1.6700 | v3 | 19.392 | | 2.563 |
| S6 | R6 | 3.65515 | d7 | C | | | | | | 2.441 |
| S7 | R7 | 25.36114 | d8 | 0.613 | nd4 | 1.5438 | v4 | 56.029 | | 2.530 |
| S8 | R8 | −9.03460 | d9 | D | | | | | | 2.557 |
| S9 | R9 | 133.73082 | d10 | 0.738 | nd5 | 1.6700 | v5 | 19.392 | | 3.429 |
| S10 | R10 | −21.13099 | d11 | 0.050 | | | | | | 3.532 |
| S11 | R11 | 6.66943 | d12 | 0.563 | nd6 | 1.4959 | v6 | 81.655 | | 3.551 |
| S12 | R12 | 3.24530 | d13 | 0.410 | | | | | | 3.791 |
| S13 | R13 | ∞ | d14 | 0.210 | ndg | 1.5168 | vg | 64.167 | | 3.825 |
| S14 | R14 | ∞ | d15 | E | | | | | | 3.848 |

Reference wavelength = 587.6 nm

TABLE 10

|  | Photographing | | |
|---|---|---|---|
|  | Wide | Tele | Contracted |
| A | 6.273 | 1.440 | 1.310 |
| B | 1.444 | 1.413 | 0.200 |
| C | 1.018 | 1.425 | 0.643 |
| D | 4.656 | 0.207 | 0.200 |
| E | 1.122 | 10.028 | 0.890 |

TABLE 11

| | Conic coefficient | Aspheric surface coefficients | | | |
|---|---|---|---|---|---|
| | k | A4 | A6 | A8 | A10 |
| S1 | 0.0000E+00 | −4.4095E−03 | 2.0708E−04 | −3.9038E−06 | −1.9264E−07 |
| S2 | 0.0000E+00 | −6.3328E−03 | 2.7470E−04 | −1.7528E−05 | 1.1901E−06 |
| S3 | −3.6269E−01 | 4.9698E−04 | 9.1645E−06 | 5.8361E−06 | −1.8648E−06 |
| S4 | 0.0000E+00 | 5.7932E−03 | −4.6315E−04 | 4.4802E−05 | −4.1143E−06 |
| S5 | 0.0000E+00 | −1.0829E−02 | 3.3479E−03 | −8.3487E−04 | 1.3433E−04 |
| S6 | −4.0285E+00 | −1.4720E−02 | 4.4418E−03 | −1.0849E−03 | 1.7666E−04 |
| S7 | 0.0000E+00 | −6.8090E−03 | 4.4941E−04 | 1.9025E−04 | −5.2820E−07 |
| S8 | 4.1694E+00 | 5.6632E−04 | 2.3946E−04 | 2.1157E−04 | −1.1785E−05 |
| S9 | 0.0000E+00 | 3.6015E−03 | −2.2196E−03 | 8.3091E−04 | −1.6445E−04 |
| S10 | 0.0000E+00 | −7.2986E−03 | 2.0443E−03 | 1.4646E−04 | −9.7643E−05 |
| S11 | −7.2588E+00 | −4.4240E−02 | 1.2333E−02 | −1.9295E−03 | 1.8668E−04 |
| S12 | −7.5252E+00 | −1.5700E−02 | 3.2886E−03 | −4.7529E−04 | 4.0819E−05 |

| | Conic coefficient | Aspheric surface coefficients | | |
|---|---|---|---|---|
| | k | A12 | A14 | A16 |
| S1 | 0.0000E+00 | 2.0604E−08 | −7.4463E−10 | 9.9131E−12 |
| S2 | 0.0000E+00 | −8.9260E−08 | 4.3084E−09 | −1.0036E−10 |
| S3 | −3.6269E−01 | 3.0197E−07 | −2.3163E−08 | 7.0698E−10 |
| S4 | 0.0000E+00 | 3.2966E−07 | −1.9572E−08 | 6.0139E−10 |
| S5 | 0.0000E+00 | −1.3718E−05 | 8.2984E−07 | −2.2114E−08 |
| S6 | −4.0285E+00 | −1.9160E−05 | 1.2721E−06 | −3.6712E−08 |
| S7 | 0.0000E+00 | −7.6718E−06 | 9.7243E−07 | −4.1555E−08 |
| S8 | 4.1694E+00 | −1.0882E−06 | −3.6653E−08 | 7.6618E−09 |
| S9 | 0.0000E+00 | 1.7312E−05 | −9.4394E−07 | 2.0940E−08 |
| S10 | 0.0000E+00 | 1.2379E−05 | −6.9673E−07 | 1.5505E−08 |
| S11 | −7.2588E+00 | −1.1020E−05 | 4.7200E−07 | −8.0207E−09 |
| S12 | −7.5252E+00 | −2.0251E−06 | 5.3252E−08 | −5.6470E−10 |

TABLE 12

|  | Wide | Tele |
|---|---|---|
| Fno | 1.94 | 3.06 |
| 2ω (°) | 47.74 | 24.12 |
| f (mm) | 9.237 | 18.455 |

|  | Wide | Tele | Contracted |
|---|---|---|---|
| TTL (mm) | 19.600 | 19.600 | 8.331 |
| LB (mm) | 1.742 | 10.648 | 1.510 |
| f1 (mm) | −16.937 | | |
| f2 (mm) | 5.808 | | |
| f3 (mm) | −7.102 | | |
| f4 (mm) | 12.327 | | |
| fG5 (mm) | −28.472 | | |
| f5 (mm) | 27.286 | | |
| f6 (mm) | −13.481 | | |
| IH (mm) | 4.000 | | |
| Zoom ratio | 1.998 | | |

As shown in Table 21, Embodiment 3 satisfies the conditions (1) to (10).

Figure 8:
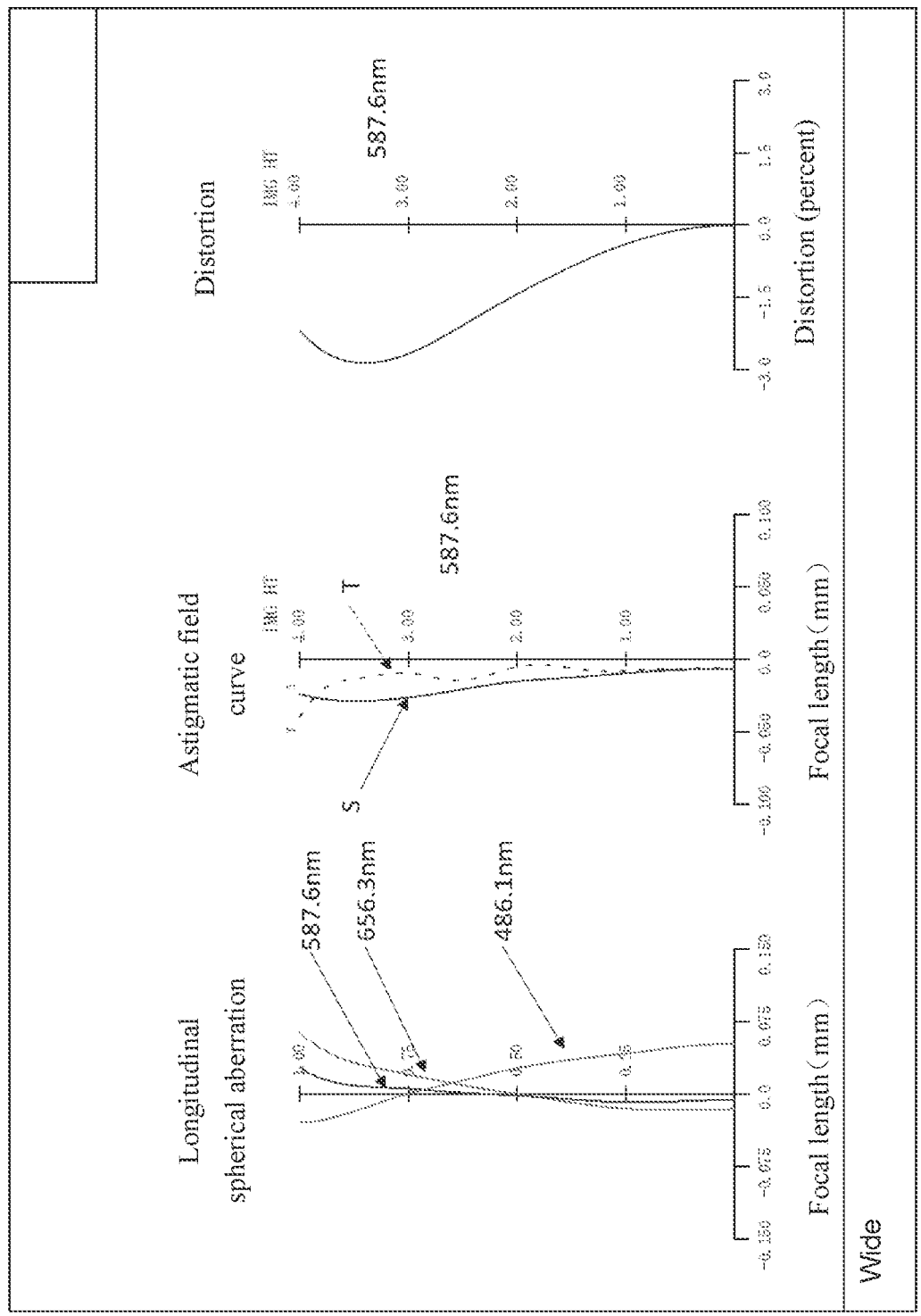
FIG. 8 is a schematic diagram showing longitudinal spherical aberrations, astigmatic field curves and distortions of the zoom lens LA at the wide angle end according to Embodiment 3 of the present disclosure.
Figure 9:
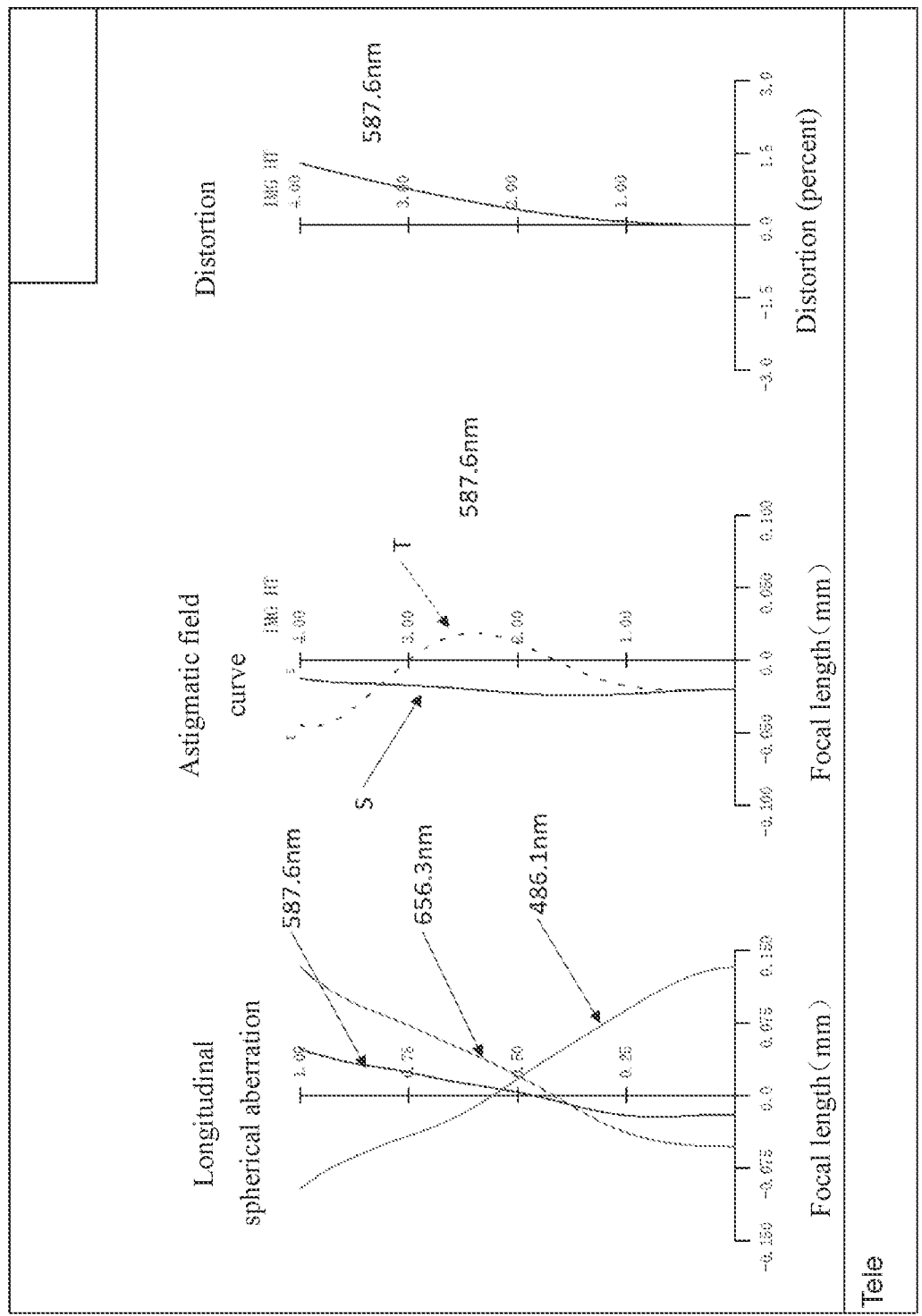
FIG. 9 is a schematic diagram showing longitudinal spherical aberrations, astigmatic field curves and distortions of the zoom lens LA at the telephoto end according to Embodiment 3 of the present disclosure.

FIG. 8 is a schematic diagram showing longitudinal spherical aberrations, astigmatic field curves and distortions of the zoom lens LA at the wide angle end according to Embodiment 3 of the present disclosure. FIG. 9 is a schematic diagram showing longitudinal spherical aberrations, astigmatic field curves and distortions of the zoom lens LA at the telephoto end according to Embodiment 3 of the present disclosure. It can be known that the zoom lens becomes miniature with TTL equal to 8.331 and becomes bright with Fno equal to 1.94 and has a zoom ratio equal to 1.998 at the wide angle end and has excellent optical performance as shown in FIG. 8 and FIG. 9 in Embodiment 3 of the present disclosure.

Embodiment 4

Figure 10:
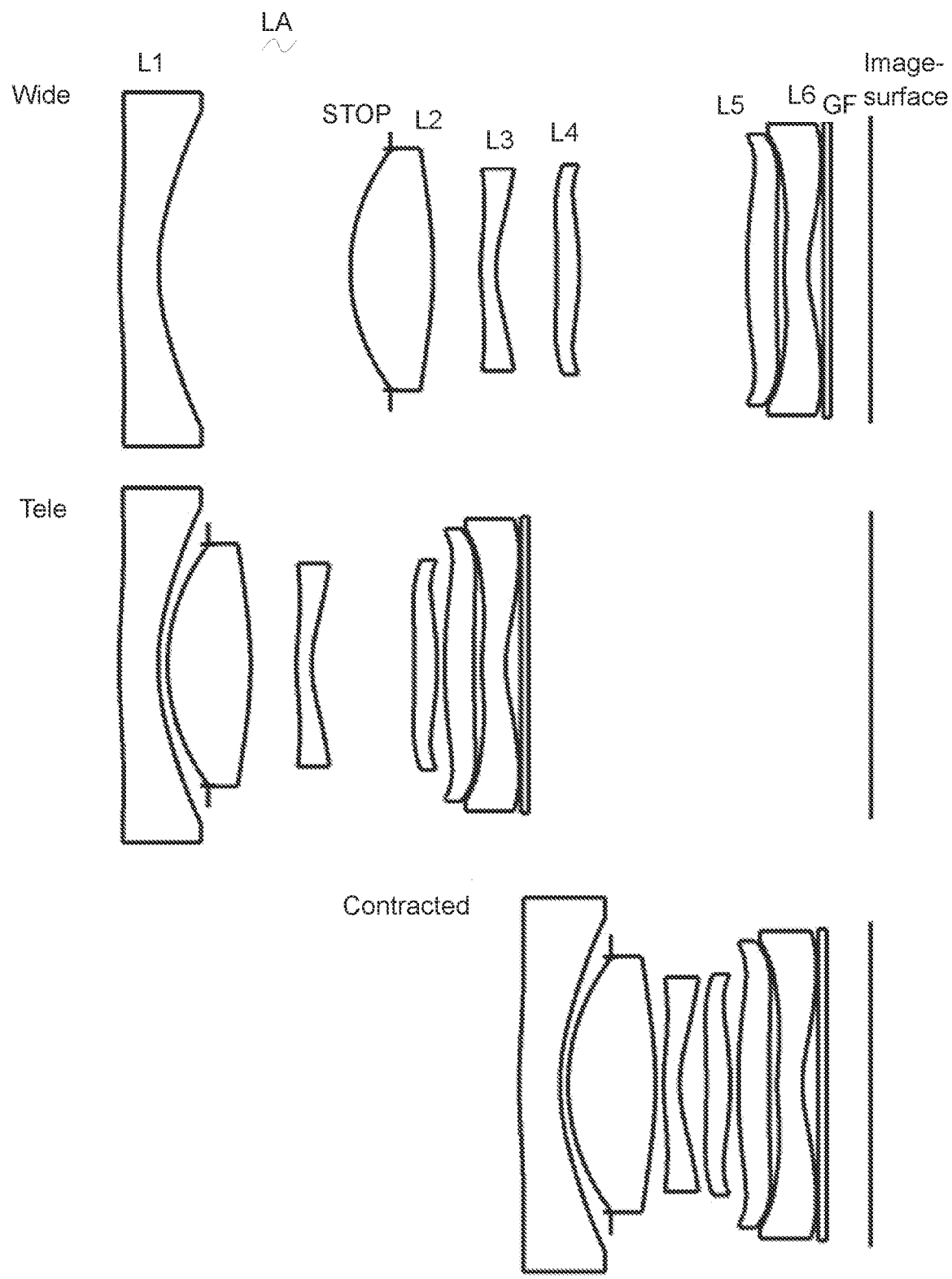
FIG. 10 is a schematic diagram of a structure of a zoom lens LA according to Embodiment 4 of the present disclosure.

FIG. 10 is a schematic diagram of a structure of the zoom LA according to Embodiment 4 of the present disclosure. Table 13 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 14 shows the values of A, B, C, D and E when contracted or photographing. Table 15 shows the conic coefficient k and the aspheric surface coefficients. Table 16 shows values of Fno, 2ω, f, TTL, LB, f1, f2, f3, f4, fG5, f5, f6, IH and zoom ratio.

TABLE 13

|  |  | R |  | d |  | nd |  | vd | Effective radius (mm) |
|---|---|---|---|---|---|---|---|---|---|
| S1 | R1 | 14.98234 | d1 | 1.013 | nd1 | 1.4959 | v1 | 81.655 | 4.634 |
| S2 | R2 | 5.26985 | D12 d2 | A | | | | | 4.122 |
| Stop | | ∞ | d3 | −1.047 | | | | | 3.153 |
| S3 | R3 | 5.04601 | d4 | 2.161 | nd2 | 1.5806 | v2 | 60.079 | 3.162 |
| S4 | R4 | −9.92541 | d5 | B | | | | | 3.081 |
| S5 | R5 | 5.74344 | d6 | 0.400 | nd3 | 1.6700 | v3 | 19.392 | 2.653 |
| S6 | R6 | 2.98243 | d7 | C | | | | | 2.555 |
| S7 | R7 | −32.32706 | d8 | 0.589 | nd4 | 1.5438 | v4 | 56.029 | 2.734 |
| S8 | R8 | −7.62534 | d9 | D | | | | | 2.712 |
| S9 | R9 | 17.33172 | d10 | 0.759 | nd5 | 1.6700 | v5 | 19.392 | 3.439 |
| S10 | R10 | 34.53207 | d11 | 0.205 | | | | | 3.552 |
| S11 | R11 | 5.78882 | d12 | 0.625 | nd6 | 1.4959 | v6 | 81.655 | 3.559 |
| S12 | R12 | 3.30504 | d13 | 0.390 | | | | | 3.810 |
| S13 | R13 | ∞ | d14 | 0.210 | ndg | 1.5168 | vg | 64.167 | 3.838 |
| S14 | R14 | ∞ | d15 | E | | | | | 3.860 |

Reference wavelength = 587.6 nm

TABLE 14

|  | Photographing |  |  |
|---|---|---|---|
|  | Wide | Tele | Contracted |
| A | 6.050 | 1.297 | 1.247 |
| B | 1.240 | 1.194 | 0.200 |
| C | 1.581 | 2.678 | 0.660 |
| D | 4.383 | 0.200 | 0.200 |
| E | 1.042 | 8.927 | 0.890 |

TABLE 15

|  | Conic coefficient | Aspheric surface coefficients | | | |
|---|---|---|---|---|---|
|  | k | A4 | A6 | A8 | A10 |
| S1 | 0.0000E+00 | −3.7536E−03 | 2.2036E−04 | −1.0070E−05 | 4.2179E−07 |
| S2 | 0.0000E+00 | −5.1108E−03 | 2.7540E−04 | −1.8794E−05 | 1.1984E−06 |
| S3 | −5.1704E−01 | 3.5277E−04 | 3.0334E−05 | −9.5870E−06 | 2.3186E−06 |
| S4 | 0.0000E+00 | 2.5600E−03 | 4.2044E−05 | −4.4946E−05 | 8.1661E−06 |
| S5 | 0.0000E+00 | −3.3766E−02 | 8.2127E−03 | −1.7569E−03 | 2.7773E−04 |

TABLE 15-continued

| | | | | |
|---|---|---|---|---|
| S6 | −4.8937E+00 | −2.2706E−02 | 7.0416E−03 | −1.7633E−03 | 3.2056E−04 |
| S7 | 0.0000E+00 | 4.7585E−04 | 6.9018E−04 | −7.4376E−06 | 7.4010E−06 |
| S8 | −1.1589E+01 | 1.1854E−04 | 9.4606E−04 | −7.7468E−06 | 1.1519E−06 |
| S9 | 0.0000E+00 | 3.4171E−03 | −1.3641E−03 | 4.1669E−04 | −8.5975E−05 |
| S10 | 0.0000E+00 | −5.7698E−03 | 1.7512E−03 | −1.8602E−04 | −5.6310E−06 |
| S11 | −4.0247E+00 | −4.3700E−02 | 1.0875E−02 | −1.7947E−03 | 2.0457E−04 |
| S12 | −7.4985E+00 | −1.8283E−02 | 4.0547E−03 | −6.2900E−04 | 6.4181E−05 |

| | Conic coefficient | Aspheric surface coefficients | | |
|---|---|---|---|---|
| | k | A12 | A14 | A16 |
| S1 | 0.0000E+00 | −1.3804E−08 | 2.8803E−10 | −2.7601E−12 |
| S2 | 0.0000E+00 | −6.1311E−08 | 1.9359E−09 | −2.8147E−11 |
| S3 | −5.1704E−01 | −3.3809E−07 | 2.5780E−08 | −8.4890E−10 |
| S4 | 0.0000E+00 | −8.5217E−07 | 4.8947E−08 | −1.2589E−09 |
| S5 | 0.0000E+00 | −2.8852E−05 | 1.7428E−06 | −4.5614E−08 |
| S6 | −4.8937E+00 | −3.7570E−05 | 2.5214E−06 | −7.1912E−08 |
| S7 | 0.0000E+00 | −8.7561E−07 | −1.0308E−07 | 1.0630E−08 |
| S8 | −1.1589E+01 | 1.9139E−06 | −4.8498E−07 | 2.7389E−08 |
| S9 | 0.0000E+00 | 9.3294E−06 | −5.2187E−07 | 1.1906E−08 |
| S10 | 0.0000E+00 | 2.2998E−06 | −1.7674E−07 | 4.8751E−09 |
| S11 | −4.0247E+00 | −1.5144E−05 | 6.1970E−07 | −1.0232E−08 |
| S12 | −7.4985E+00 | −4.0456E−06 | 1.3823E−07 | −1.9138E−09 |

TABLE 16

| | Wide | Tele |
|---|---|---|
| Fno | 1.96 | 3.10 |
| 2ω (°) | 46.99 | 24.12 |
| f (mm) | 9.253 | 18.526 |

| | Wide | Tele | Contracted |
|---|---|---|---|
| TTL (mm) | 19.600 | 19.600 | 8.501 |
| LB (mm) | 1.642 | 9.527 | 1.490 |
| f1 (mm) | −16.979 | | |
| f2 (mm) | 6.084 | | |
| f3 (mm) | −9.831 | | |
| f4 (mm) | 18.198 | | |
| fG5 (mm) | −27.090 | | |
| f5 (mm) | 51.027 | | |
| f6 (mm) | −16.945 | | |
| IH (mm) | 4.000 | | |
| Zoom ratio | 2.002 | | |

As shown in Table 21, Embodiment 4 satisfies the conditions (1) to (10).

Figure 11:
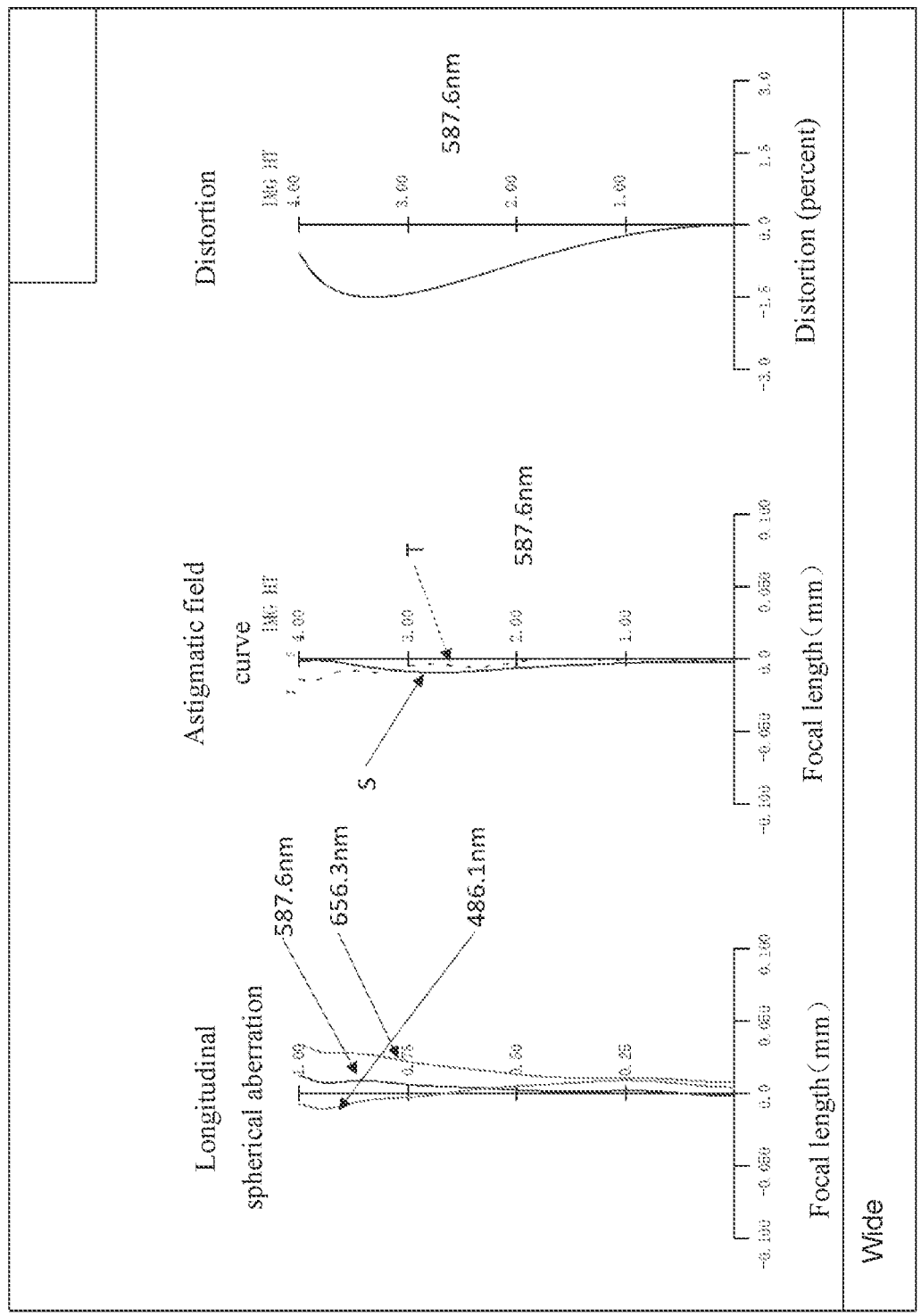
FIG. 11 is a schematic diagram showing longitudinal spherical aberrations, astigmatic field curves and distortions of the zoom lens LA at the wide angle end according to Embodiment 4 of the present disclosure.
Figure 12:
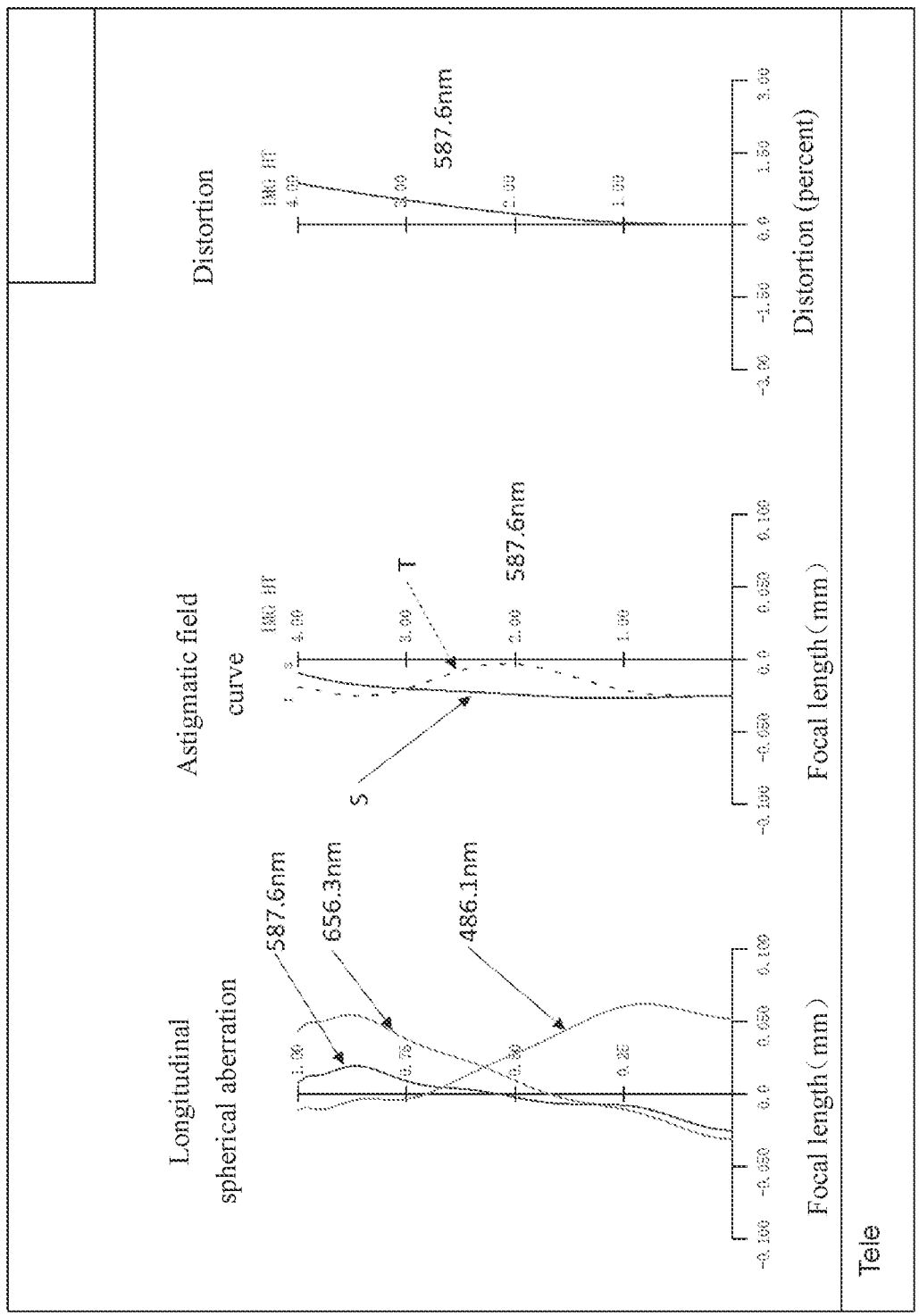
FIG. 12 is a schematic diagram showing longitudinal spherical aberrations, astigmatic field curves and distortions of the zoom lens LA at the telephoto end according to Embodiment 4 of the present disclosure.

FIG. 11 is a schematic diagram showing longitudinal spherical aberrations, astigmatic field curves and distortions of the zoom lens LA at the wide angle end according to Embodiment 4 of the present disclosure. FIG. 12 is a schematic diagram showing longitudinal spherical aberrations, astigmatic field curves and distortions of the zoom lens LA at the telephoto end according to Embodiment 4 of the present disclosure. It can be known that the zoom lens becomes miniature with TTL equal to 8.501 and becomes bright with Fno equal to 1.96 and has a zoom ratio equal to 2.002 at the wide angle end and has excellent optical performance as shown in FIG. 11 and FIG. 12 in Embodiment 4 of the present disclosure.

Embodiment 5

Figure 13:
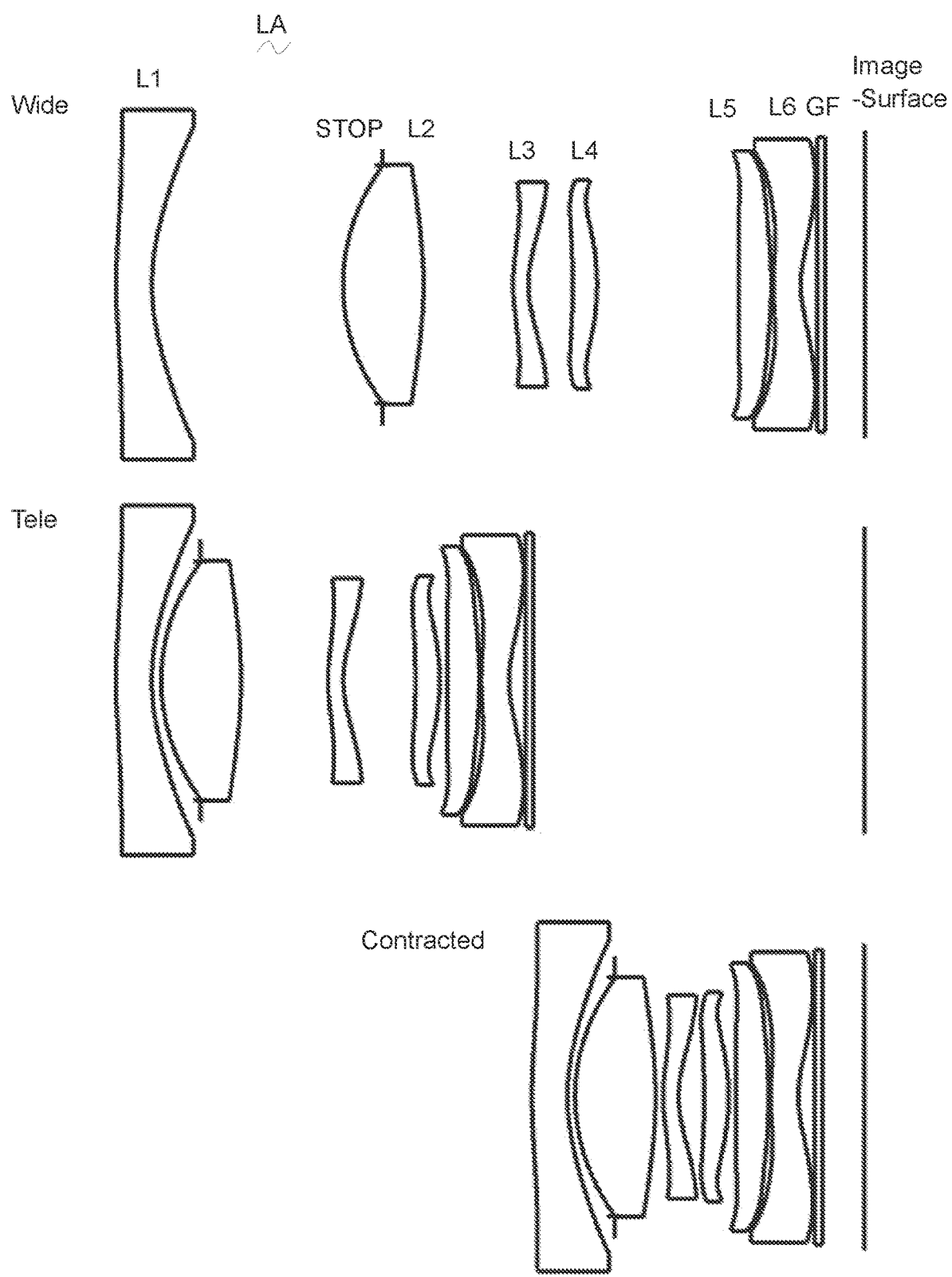
FIG. 13 is a schematic diagram of a structure of a zoom lens LA according to Embodiment 5 of the present disclosure.

FIG. 13 is a schematic diagram of a structure of the zoom LA according to Embodiment 5 of the present disclosure. Table 17 shows the central curvature radiuses R of the object-side surfaces and the image-side surfaces of the zoom lens LA of the first lens L1 to the six lens L6, the on-axis thicknesses d of the lenses, the on-axis distances d between the lenses, the refractive indexes nd and the abbe numbers vd. Table 18 shows the values of A, B, C, D and E when contracted or photographing. Table 19 shows the conic coefficient k and the aspheric surface coefficients. Table 20 shows values of Fno, 2ω, f, TTL, LB, f1, f2, f3, f4, fG5, f5, f6, IH and zoom ratio.

TABLE 17

| | | R | d | | nd | | vd | effective radius (mm) |
|---|---|---|---|---|---|---|---|---|
| S1 | R1 | 14.54031 | d1 | 0.932 | nd1 | 1.5264 | v1 | 76.860 | 4.584 |
| S2 | R2 | 5.48677 | D12 | d2 | A | | | | 4.128 |
| Stop | | ∞ | d3 | −1.020 | | | | | 3.134 |
| S3 | R3 | 5.00546 | d4 | 2.099 | nd2 | 1.5264 | v2 | 76.860 | 3.144 |
| S4 | R4 | −11.41165 | d5 | B | | | | | 3.107 |
| S5 | R5 | 4.72445 | d6 | 0.400 | nd3 | 1.6700 | v3 | 19.392 | 2.680 |
| S6 | R6 | 2.80958 | d7 | C | | | | | 2.648 |
| S7 | R7 | −28.21289 | d8 | 0.639 | nd4 | 1.5438 | v4 | 56.029 | 2.747 |
| S8 | R8 | −6.01316 | d9 | D | | | | | 2.724 |
| S9 | R9 | −35.22355 | d10 | 0.847 | nd5 | 1.6700 | v5 | 19.392 | 3.413 |
| S10 | R10 | −11.12353 | d11 | 0.050 | | | | | 3.516 |
| S11 | R11 | 6.55954 | d12 | 0.725 | nd6 | 1.5264 | v6 | 76.860 | 3.517 |
| S12 | R12 | 2.95172 | d13 | 0.430 | | | | | 3.811 |
| S13 | R13 | ∞ | d14 | 0.210 | ndg | 1.5168 | vg | 64.167 | 3.843 |
| S14 | R14 | ∞ | d15 | E | | | | | 3.865 |

Reference wavelength = 587.6 nm

TABLE 18

|   | Photographing | | |
|---|---|---|---|
|   | Wide | Tele | Contracted |
| A | 6.028 | 1.271 | 1.221 |
| B | 2.355 | 2.272 | 0.200 |
| C | 1.155 | 1.876 | 0.680 |

TABLE 18-continued

|   | Photographing | | |
|---|---|---|---|
|   | Wide | Tele | Contracted |
| D | 3.713 | 0.200 | 0.200 |
| E | 1.037 | 8.668 | 0.890 |

TABLE 19

|   | Conic coefficient | Aspheric surface coefficients | | | |
|---|---|---|---|---|---|
|   | k | A4 | A6 | A8 | A10 |
| S1  | 0.0000E+00  | −3.4372E−03 |  1.9939E−04 | −8.9861E−06 |  3.3833E−07 |
| S2  | 0.0000E+00  | −4.5696E−03 |  2.3843E−04 | −1.4091E−05 |  6.7722E−07 |
| S3  | −6.1134E−01 |  1.2020E−04 |  4.7405E−05 | −1.4912E−05 |  3.4106E−06 |
| S4  | 0.0000E+00  |  1.5507E−03 | −1.2703E−05 | −2.3469E−06 |  2.9676E−07 |
| S5  | 0.0000E+00  | −2.9557E−02 |  4.9607E−03 | −7.3211E−04 |  7.3824E−05 |
| S6  | −4.0488E+00 | −1.8215E−02 |  3.6392E−03 | −5.8151E−04 |  5.8514E−05 |
| S7  | 0.0000E+00  | −3.2762E−03 |  6.4781E−04 | −1.1358E−04 |  7.8336E−05 |
| S8  | −8.8647E+00 | −4.1463E−03 |  9.4507E−04 |  2.3621E−05 | −3.4675E−06 |
| S9  | 0.0000E+00  |  9.1110E−03 | −2.6888E−03 |  6.0171E−04 | −8.8958E−05 |
| S10 | 0.0000E+00  |  8.4438E−03 | −3.4629E−03 |  9.4445E−04 | −1.3749E−04 |
| S11 | −5.7915E+00 | −3.2471E−02 |  4.9171E−03 | −3.0991E−04 |  9.4133E−07 |
| S12 | −6.7555E+00 | −1.7289E−02 |  3.2197E−03 | −4.1572E−04 |  3.5257E−05 |

|   | Conic coefficient | Aspheric surface coefficients | | |
|---|---|---|---|---|
|   | k | A12 | A14 | A16 |
| S1  | 0.0000E+00  | −9.3236E−09 |  1.6970E−10 | −1.5497E−12 |
| S2  | 0.0000E+00  | −2.7519E−08 |  8.1238E−10 | −1.2348E−11 |
| S3  | −6.1134E−01 | −4.4619E−07 |  3.0616E−08 | −8.9323E−10 |
| S4  | 0.0000E+00  | −6.9638E−08 |  8.0230E−09 | −3.6431E−10 |
| S5  | 0.0000E+00  | −5.1003E−06 |  2.6712E−07 | −8.2591E−09 |
| S6  | −4.0488E+00 | −3.4616E−06 |  1.3256E−07 | −2.9525E−09 |
| S7  | 0.0000E+00  | −1.2556E−05 |  7.3534E−07 | −1.3887E−08 |
| S8  | −8.8647E+00 |  6.8276E−06 | −1.2375E−06 |  5.8817E−08 |
| S9  | 0.0000E+00  |  7.5377E−06 | −3.4555E−07 |  6.7229E−09 |
| S10 | 0.0000E+00  |  1.0482E−05 | −4.1404E−07 |  6.8885E−09 |
| S11 | −5.7915E+00 |  4.1863E−07 |  3.3193E−09 | −4.5789E−10 |
| S12 | −6.7555E+00 | −1.9038E−06 |  5.7222E−08 | −6.9007E−10 |

TABLE 20

|   | Wide | Tele |
|---|---|---|
| Fno | 1.96 | 3.13 |
| 2ω (°) | 46.73 | 23.91 |
| f (mm) | 9.254 | 18.635 |

|   | Wide | Tele | Contracted |
|---|---|---|---|
| TTL (mm) | 19.600 | 19.600 | 8.503 |
| LB (mm) | 1.677 | 9.308 | 1.530 |
| f1 (mm) | −17.356 | | |
| f2 (mm) | 6.914 | | |
| f3 (mm) | −11.292 | | |
| f4 (mm) | 13.911 | | |
| fG5 (mm) | −21.439 | | |
| f5 (mm) | 23.926 | | |
| f6 (mm) | −10.954 | | |
| IH (mm) | 4.000 | | |
| Zoom ratio | 2.014 | | |

As shown in Table 21, Embodiment 5 satisfies the conditions (1) to (10).

Figure 14:
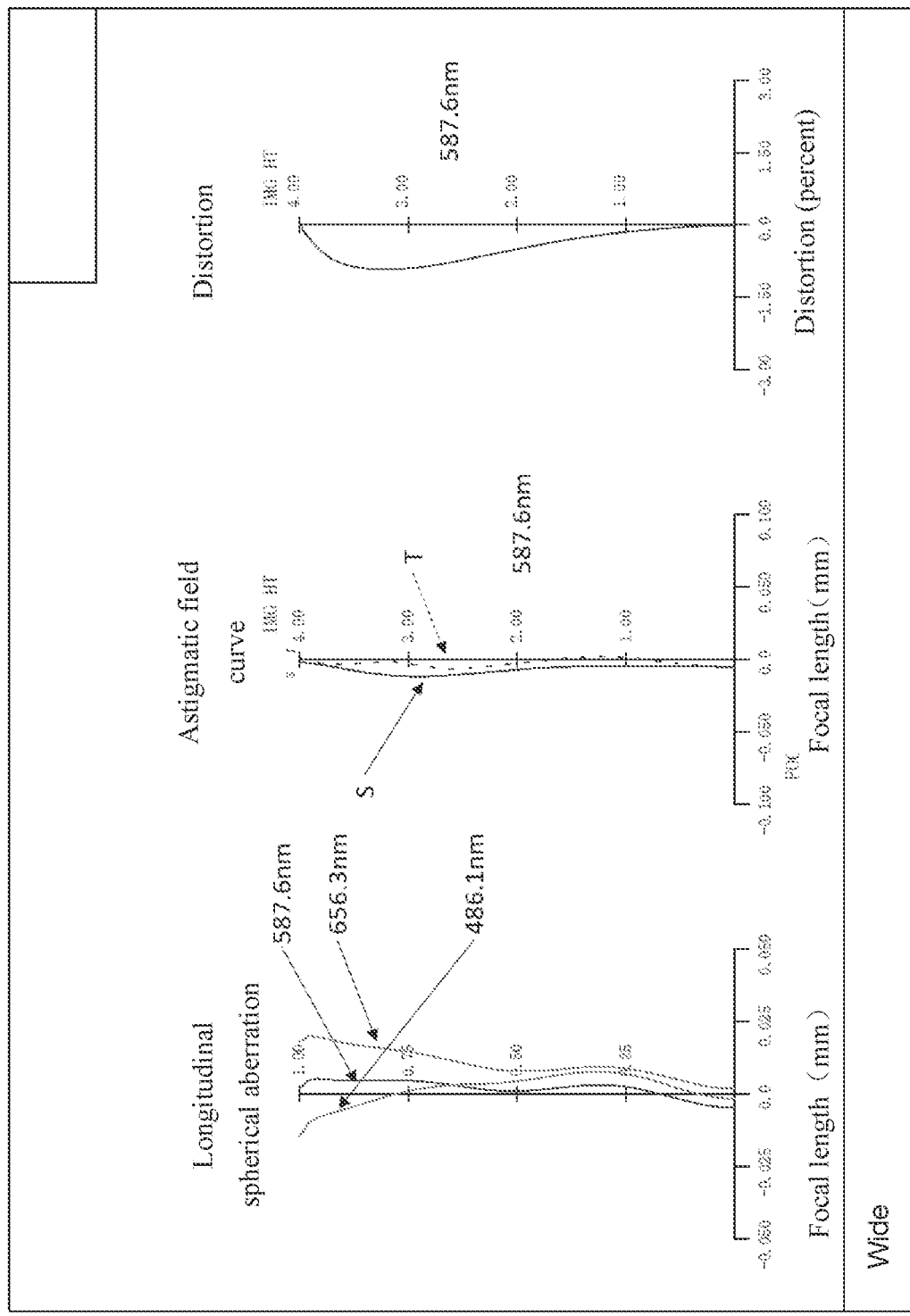
FIG. 14 is a schematic diagram showing longitudinal spherical aberrations, astigmatic field curves and distortions of the zoom lens LA at the wide angle end according to Embodiment 5 of the present disclosure.
Figure 15:
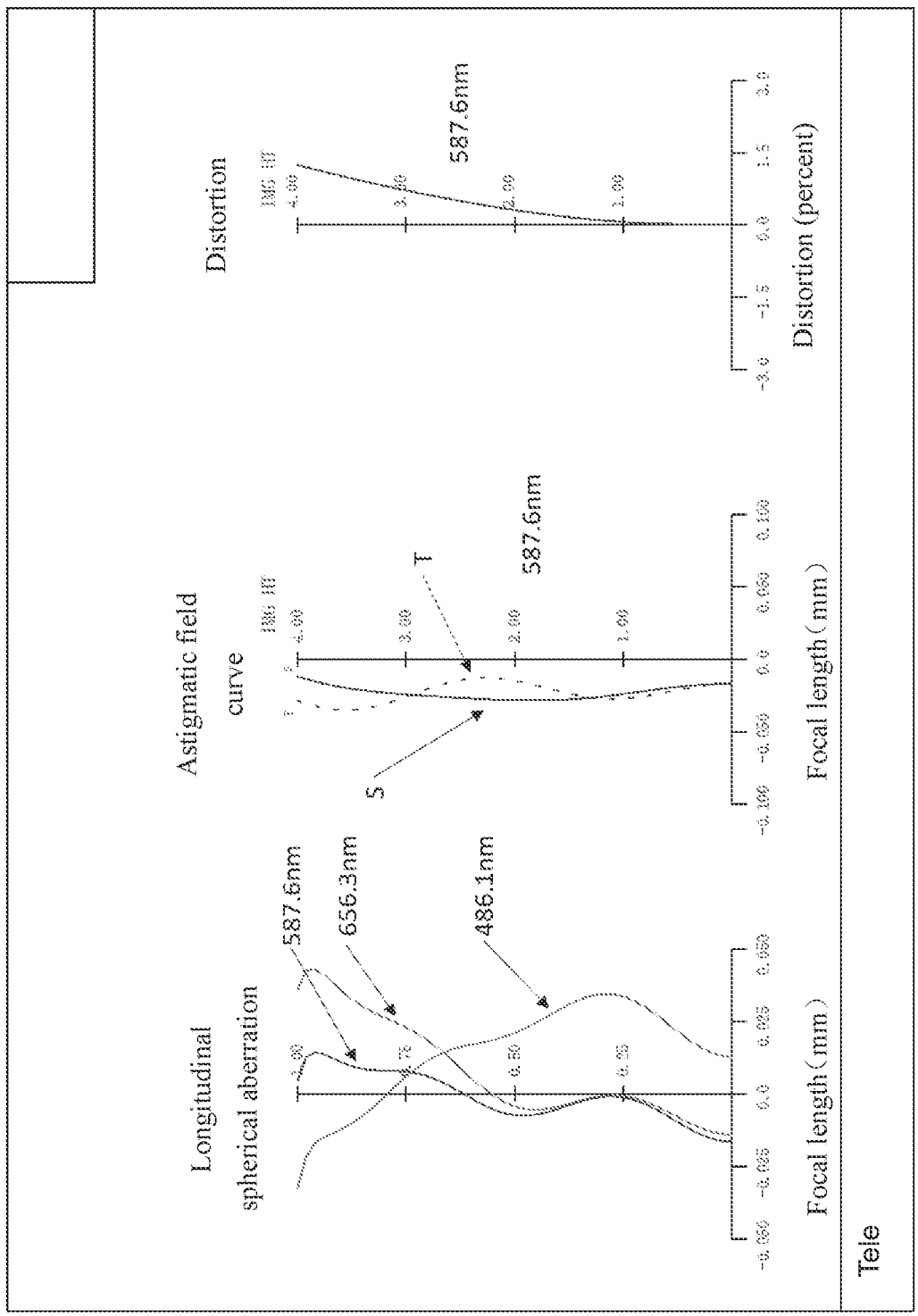
FIG. 15 is a schematic diagram showing longitudinal spherical aberrations, astigmatic field curves and distortions of the zoom lens LA at the telephoto end according to Embodiment 5 of the present disclosure.

FIG. 14 is a schematic diagram showing longitudinal spherical aberrations, astigmatic field curves and distortions of the zoom lens LA at the wide angle end according to Embodiment 5 of the present disclosure. FIG. 15 is a schematic diagram showing longitudinal spherical aberrations, astigmatic field curves and distortions of the zoom lens LA at the telephoto end according to Embodiment 5 of the present disclosure. It can be known that the zoom lens becomes miniature with TTL equal to 8.503 and becomes bright with Fno equal to 1.96 and has a zoom ratio equal to 2.014 at the wide angle end and has excellent optical performance as shown in FIG. 14 and FIG. 15 in Embodiment 5 of the present disclosure.

Table 21 shows various parameters of Embodiments 1, 2, 3, 4 and 5 and values corresponding to the parameters specified in the above conditions (1) to (10).

TABLE 21

|  | Embodiment 1 | Embodiment 2 | Embodiment 3 | Embodiment 4 | Embodiment 5 | Memo |
|---|---|---|---|---|---|---|
| f_Tele/f_Wide | 2.000 | 2.000 | 1.998 | 2.002 | 2.014 | Condition (1) |
| f3/f2 | −1.391 | −1.802 | −1.223 | −1.616 | −1.633 | Condition (2) |
| f4/f2 | 2.012 | 2.242 | 2.123 | 2.991 | 2.012 | Condition (3) |
| f1/f2 | −3.183 | −2.516 | −2.916 | 1.727 | −2.510 | Condition (4) |
| fG5/f2 | −3.435 | −2.622 | −4.903 | −4.452 | −3.101 | Condition (5) |
| f5/f6 | −2.196 | −2.542 | −2.024 | −3.011 | −2.184 | Condition (6) |
| LB_Tele/LB_Wide | 6.191 | 4.799 | 6.111 | 5.802 | 5.551 | Condition (7) |
| v1 | 81.655 | 81.655 | 81.655 | 81.655 | 76.860 | Condition (8) |
| v2 | 60.079 | 60.079 | 60.079 | 60.079 | 76.860 | Condition (9) |
| v6 | 81.655 | 81.655 | 81.655 | 81.655 | 76.860 | Condition (10) |

It will be understood by those of ordinary skill in the art that the embodiments described above are specific embodiments realizing the present disclosure, and that in practical applications, various changes may be made thereto in form and in detail without departing from the range and scope of the disclosure.

What is claimed is:

1. A zoom lens comprising, from an object side to an image side in sequence: a first lens having a negative refractive power, a second lens having a positive refractive power, a third lens having a negative refractive power, a fourth lens having a positive refractive power, a fifth lens group having a negative refractive power; wherein distances between adjacent two of the first lens, the second lens, the third lens, the fourth lens and the fifth lens group are variable in the direction of an optical axis;

the fifth lens group comprises a fifth lens having a positive refractive power and a sixth lens having a negative refractive power;

the zoom lens satisfies conditions of:

$$f\_Tele/f\_Wide > 1.8; \quad (1)$$

$$-1.85 \leq f3/f2 \leq -1.20; \text{ and} \quad (2)$$

$$2.00 \leq f4/f2 \leq 3.00; \quad (3)$$

where f_Wide denotes a focal length of the zoom lens at the wide angle end;

f_Tele denotes a focal length of the zoom lens at the telephoto end;

f2 denotes a focal length of the second lens;

f3 denotes a focal length of the third lens; and f4 denotes a focal length of the fourth lens.

2. The zoom lens according to claim 1, wherein the zoom lens further satisfies a condition of:

$$-3.20 \leq f1/f2 \leq -2.50; \quad (4)$$

where f1 denotes a focal length of the first lens; and f2 denotes a focal length of the second lens.

3. The zoom lens according to claim 1, wherein the zoom lens further satisfies a condition of:

$$-5.00 \leq fG5/f2 \leq -2.50; \text{ and} \quad (5)$$

$$-3.10 \leq f5/f6 \leq -2.00; \quad (6)$$

where f2 denotes a focal length of the second lens;

fG5 denotes a combined focal length of the fifth lens group;

f5 denotes a focal length of the fifth lens; and f6 denotes a focal length of the sixth lens.

4. The zoom lens according to claim 1, wherein the zoom lens further satisfies a condition of:

$$4.78 \leq LB\_Tele/LB\_Wide \leq 6.20; \quad (7)$$

where

LB_Wide denotes an on-axis distance from an image-side surface of the sixth lens to an image surface at the wide angel end; and LB_Tele denotes an on-axis distance from an image-side surface of the sixth lens to an image surface at the telephoto end.

5. The zoom lens according to claim 1, wherein the zoom lens further satisfies a condition of:

$$76.00 \leq v1 \leq 82.00; \quad (8)$$

$$58.00 \leq v2 \leq 78.00; \text{ and} \quad (9)$$

$$76.00 \leq v6 \leq 82.00; \quad (10)$$

where v1 denotes an abbe number of the first lens L1;

v2 denotes an abbe number of the second lens L2; and v6 denotes an abbe number of the sixth lens L6.

* * * * *